(12) United States Patent
House et al.

(10) Patent No.: US 11,258,070 B2
(45) Date of Patent: *Feb. 22, 2022

(54) GRAPHENE-ENABLED BI-POLAR ELECTRODE AND BATTERY CONTAINING SAME

(71) Applicant: Global Graphene Group, Inc., Dayton, OH (US)

(72) Inventors: Evan House, Miamisburg, OH (US); Aruna Zhamu, Springboro, OH (US); Bor Z. Jang, Centerville, OH (US)

(73) Assignee: Global Graphene Group, Inc., Dayton, OH (US)

(*) Notice: Subject to any disclaimer, the term of this patent is extended or adjusted under 35 U.S.C. 154(b) by 196 days.

This patent is subject to a terminal disclaimer.

(21) Appl. No.: 16/580,324

(22) Filed: Sep. 24, 2019

(65) Prior Publication Data

US 2021/0091383 A1    Mar. 25, 2021

(51) Int. Cl.

| | |
|---|---|
| *H01M 4/66* | (2006.01) |
| *H01M 4/36* | (2006.01) |
| *H01G 11/68* | (2013.01) |
| *H01G 11/32* | (2013.01) |
| *H01G 11/24* | (2013.01) |
| *H01G 11/28* | (2013.01) |
| *H01G 11/06* | (2013.01) |

(Continued)

(52) U.S. Cl.
CPC .......... *H01M 4/661* (2013.01); *H01G 11/24* (2013.01); *H01G 11/28* (2013.01); *H01G 11/32* (2013.01); *H01G 11/68* (2013.01); *H01M 4/366* (2013.01); *H01G 11/06* (2013.01); *H01M 10/0525* (2013.01); *H01M 2004/029* (2013.01)

(58) Field of Classification Search
None
See application file for complete search history.

(56) References Cited

U.S. PATENT DOCUMENTS

| | | | |
|---|---|---|---|
| 7,071,258 B1 | 7/2006 | Jang et al. | |
| 7,998,616 B2 * | 8/2011 | Buiel | H01G 11/32 429/211 |

(Continued)

OTHER PUBLICATIONS

Anderson et al., "The Use of Esters of N-Hydroxysuccinimide in Peptide Synthesis" J. Amer. Chem. Soc. (1964) vol. 86, No. 9, pp. 1839-1842.

(Continued)

*Primary Examiner* — Daniel S Gatewood

(57) ABSTRACT

Provided is a bi-polar electrode for a battery, wherein the bi-polar electrode comprises: (a) a current collector comprising a conductive material foil (e.g. metal foil) having a thickness from 10 nm to 100 μm and two opposed, parallel primary surfaces, wherein one or both of the primary surfaces is coated with a layer of graphene material having a thickness from 10 nm to 10 μm; and (b) a negative electrode layer and a positive electrode layer respectively disposed on the two sides of the current collector, each in physical contact with the layer of graphene material or directly with a primary surface of the conductive material foil (if not coated with a graphene material layer). Also provided is a battery comprising multiple (e.g. 2-300) bipolar electrodes internally connected in series. There can be multiple bi-polar electrodes that are connected in parallel.

26 Claims, 11 Drawing Sheets

(51) Int. Cl.
*H01M 4/02* (2006.01)
*H01M 10/0525* (2010.01)

(56) References Cited

U.S. PATENT DOCUMENTS

| | | |
|---|---|---|
| 2005/0271574 A1 | 12/2005 | Jang et al. |
| 2008/0048152 A1 | 2/2008 | Jang et al. |
| 2014/0329142 A1* | 11/2014 | Dickinson ............ H01M 10/06 429/211 |
| 2018/0040900 A1* | 2/2018 | Zhamu .............. H01M 10/0525 |

OTHER PUBLICATIONS

Hummers et al., "Preparation of graphitic oxide" J. Am. Chem. Soc. (1958) vol. 80, p. 1339.

Karlicky et al., "Halogenated Graphenes: Rapidly Growing Family of Graphene Derivatives" ACS Nano (2013) vol. 7, No. 8, pp. 6434-6464.

* cited by examiner

GRAPHENE-ENABLED BI-POLAR ELECTRODE AND BATTERY CONTAINING SAME

FIELD

The present disclosure provides a bi-polar electrode for a battery or capacitor, particularly a lithium battery, supercapacitor, or lithium-ion capacitor.

BACKGROUND

This patent application is related to a bi-polar electrode comprising a current collector (conductive material foil, such as Cu foil or Al foil) that is coated with a negative electrode layer (anode active material layer) on one primary surface of a current collector and coated with a positive electrode layer (cathode active material layer) on the opposing primary surface of the same current collector. Such a bi-polar electrode is particularly useful for, but not limited to, the lithium battery (e.g. lithium-ion battery, lithium-metal battery, or lithium-ion capacitor), a supercapacitor, a non-lithium battery (e.g. the zinc-air battery, nickel metal hydride battery, sodium-ion battery, and magnesium-ion battery), and other electrochemical energy storage devices.

The lithium-metal battery includes the conventional lithium-metal rechargeable battery (e.g. using a lithium foil as the anode and $MnO_2$ particles as the cathode active material), lithium-air battery (Li-Air), lithium-sulfur battery (Li—S), and the emerging metal-graphene battery (e.g. Li-graphene, using graphene sheets as a cathode active material), lithium-carbon nanotube battery (Li-CNT, using CNTs as a cathode), and lithium-nano carbon cell (Li—C, using nano carbon fibers or other nano carbon materials as a cathode). The anode and/or the cathode active material layer can contain some lithium, or can be prelithiated prior to or immediately after cell assembly.

Rechargeable lithium-ion (Li-ion), lithium metal, lithium-sulfur, and Li metal-air batteries are considered promising power sources for electric vehicle (EV), hybrid electric vehicle (HEV), and portable electronic devices, such as lap-top computers and mobile phones. Lithium as a metal element has the highest lithium storage capacity (3,861 mAh/g) compared to any other metal or metal-intercalated compound as an anode active material (except $Li_{4.4}Si$, which has a specific capacity of 4,200 mAh/g). Hence, in general, Li metal batteries (having a lithium metal anode) have a significantly higher energy density than conventional lithium-ion batteries (having a graphite anode).

Historically, rechargeable lithium metal batteries were produced using non-lithiated compounds having relatively high specific capacities, such as $TiS_2$, $MoS_2$, $MnO_2$, $CoO_2$, and $V_2O_5$, as the cathode active materials, which were coupled with a lithium metal anode. When the battery was discharged, lithium ions were transferred from the lithium metal anode to the cathode through the electrolyte and the cathode became lithiated. Unfortunately, upon repeated charges and discharges, the lithium metal resulted in the formation of dendrites at the anode that ultimately caused internal shorting, thermal runaway, and explosion. As a result of a series of accidents associated with this problem, the production of these types of secondary batteries was stopped in the early 1990's giving ways to lithium-ion batteries. Even now, cycling stability and safety concerns remain the primary factors preventing the further commercialization of Li metal batteries (e.g. Lithium-sulfur and Lithium-transition metal oxide cells) for EV, HEV, and microelectronic device applications.

Prompted by the aforementioned concerns over the safety of earlier lithium metal secondary batteries led to the development of lithium-ion secondary batteries, in which pure lithium metal sheet or film was replaced by carbonaceous materials (e.g. natural graphite particles) as the anode active material. The carbonaceous material absorbs lithium (through intercalation of lithium ions or atoms between graphene planes, for instance) and desorbs lithium ions during the re-charge and discharge phases, respectively, of the lithium-ion battery operation. The carbonaceous material may comprise primarily graphite that can be intercalated with lithium and the resulting graphite intercalation compound may be expressed as $Li_xC_6$, where x is typically less than 1 (with graphite specific capacity<372 mAh/g).

Although lithium-ion (Li-ion) batteries are promising energy storage devices for electric drive vehicles, state-of-the-art Li-ion batteries have yet to meet the cost, safety, and performance targets (such as high specific energy, high energy density, good cycle stability, and long cycle life). Li-ion cells typically use a lithium transition-metal oxide or phosphate as a positive electrode (cathode) that de/re-intercalates $Li^+$ at a high potential with respect to the carbon negative electrode (anode). The specific capacity of lithium transition-metal oxide or phosphate based cathode active material is typically in the range from 140-170 mAh/g. As a result, the specific energy (gravimetric energy density) of commercially available Li-ion cells featuring a graphite anode and a lithium transition-metal oxide or phosphate based cathode is typically in the range from 120-220 Wh/kg, most typically 150-200 Wh/kg. The corresponding typical range of energy density (volumetric energy density) is from 300 to 400 Wh/L. These specific energy values are two to three times lower than what would be required in order for battery-powered electric vehicles to be widely accepted.

A typical battery cell is composed of an anode current collector, an anode electrode (also referred to as the anode active material layer, typically comprising an anode active material, a conductive filler, and a binder resin component), an electrolyte/separator, a cathode electrode (also referred to as the cathode active material layer, typically comprising a cathode active material, a conductive filler, and a binder resin), a cathode current collector, metal tabs that are connected to external wiring, and casing that wraps around all other components except for the tabs. For higher-voltage and/or higher current applications, multiple cells are aggregated together and electrically connected in series and/or in parallel to form a module and, quite often, several modules are connected in series and/or in series; e.g., for EV applications.

The sum of the weights and the sum of the volumes of these components are the total battery weight and total battery volume, respectively. The total amount of energy stored by a battery is governed by the amount of cathode active materials and the corresponding amount of anode active materials. The specific energy and energy density of a battery is then defined as the total amount of energy stored by the total battery weight and battery volume, respectively. This implies that one way to maximize the specific energy and energy density of a battery is to maximize the amounts of active materials and to minimize the amounts of all other components (non-active materials), under the constraints of other battery design considerations.

In other words, the electrical wires and welds that connect different cells together are non-active materials, which must be reduced (in weight and volume) in order to increase the gravimetric and volumetric energy densities of the battery. A strong need exists for a different type of battery design that can minimize the use of non-active materials.

SUMMARY

The present disclosure provides a bipolar electrode for a battery or capacitor. The bipolar electrode comprises a current collector (a conductive material foil) having two primary surfaces (two opposing surfaces being substantially parallel to each other), wherein at least one of the two primary surfaces is coated with a thin layer of graphene material. The layer of graphene material is sandwiched between a current collector and a negative electrode layer (anode), as illustrated in FIG. 1(C), or the layer of graphene material is sandwiched between the current collector and a positive electrode layer (cathode), as illustrated in FIG. 1(B). More preferably, a layer of graphene material (first layer) is sandwiched between a current collector and a negative electrode layer and another layer of graphene material (second layer) is sandwiched between the current collector and a positive electrode layer, as illustrated in FIG. 1(A). The first layer and the second layer of graphene material may be identical or different in composition and structure. The negative electrode layer and the positive electrode layer coated on the two opposing surfaces of a current collector are different in composition and/or structure.

The graphene-protected current collector of this bi-polar electrode is electrolyte-compatible, non-reactive, corrosion-resistant, of low contact resistance, thermally and electrically conductive, ultra-thin, and light-weight. Multiple bi-polar electrodes of this type may be connected in series and/or in parallel, enabling a battery to deliver a higher output voltage, higher energy density, high rate-capability, and much longer cycle life.

In certain embodiments, the present disclosure provides a bi-polar electrode for a battery or capacitor, wherein the bi-polar electrode comprises:
a) A current collector comprising a conductive material foil (e.g. metal foil or conducting polymer film) having a thickness from 10 nm to 100 µm and two opposed, parallel primary surfaces, wherein one or both of the primary surfaces is coated with a layer of graphene material having a thickness from 5 nm to 50 µm (preferably both primary surfaces being each coated with a layer of graphene material); and
b) a negative electrode layer (anode) and a positive electrode layer (cathode) respectively disposed on the two opposed sides of the current collector, each in physical contact with the layer of graphene material or directly with a primary surface (if no graphene material coated thereon) of the conductive material foil.

Preferably, both of the primary surfaces of the conducting material foil (e.g. Cu foil, Al foil, stainless steel foil, etc.) of the current collector are each coated with a layer of graphene material and the negative electrode layer is physically attached or chemically bonded to the one layer of graphene material and the positive electrode layer is physically attached or chemically bonded to the other layer of graphene material. In other words, a graphene material layer is sandwiched between an anode layer and the conductive material foil and another graphene material layer is sandwiched between a cathode layer and the same conductive material foil (on the opposing side).

The thickness of the layer of graphene material is more preferably from 10 nm to 10 µm, further preferably less than 3 µm, and most preferably from 30 nm to 1 µm.

In the bi-polar electrode herein disclosed, the graphene material preferably contains graphene sheets selected from pristine graphene, oxidized graphene, reduced graphene oxide, fluorinated graphene, graphene bromide, graphene chloride, graphene iodide, hydrogenated graphene, nitrogenated graphene, doped graphene, chemically functionalized graphene, or a combination thereof.

These graphene sheets may be dispersed in a matrix material or bonded by a binder material. The layer of graphene material may be chemically bonded to the conductive material foil.

Preferably, the layer of graphene material contains graphene sheets that are aligned to be substantially parallel to one another having an average angle between graphene sheets less than 15 degrees (preferably less than 10 degrees and more preferably less than 5 degrees). Preferably, these aligned graphene sheets are substantially parallel to the primary surface plane of the conductive material foil.

In certain embodiments, the conductive material foil is selected from a metal, an electrically conductive polymer, or a combination thereof. The metal may be selected from Mg, Al, Sn, Sb, Ti, V, Cr, Mn, Fe, Co, Ni, Cu, Zn, Cd, Ag, Pd, Mo, Nb, Zr, Au, Pt, W, Ta, an alloy thereof, or a combination thereof. Preferably, the surfaces of these metal foils do not have a passivating layer, such as a metal oxide film (e.g. aluminum oxide naturally occurring on aluminum metal surface as soon as a fresh Al metal surface is exposed to oxygen).

In certain embodiments, the electrically conductive polymer used to make the conductive material foil comprises a conjugated polymer selected from polyacetylene, polythiophene, poly(3-alkylthiophenes), polypyrrole, polyaniline, poly(isothianaphthene), poly(3,4-ethylene dioxythiophene), alkoxy-substituted poly(p-phenylene vinylene), poly(2,5-bis (cholestanoxy) phenylene vinylene), poly(p-phenylene vinylene), poly(2,5-dialkoxy) paraphenylene vinylene, poly [(1,4-phenylene-1,2-diphenylvinylene)], poly(3',7'-dimethyloctyloxy phenylene vinylene), polyparaphenylene, polyparaphenylene, polyparaphenylene sulphide, polyheptadiyne, poly(3-hexylthiophene), poly(3-octylthiophene), poly(3-cyclohexylthiophene), poly(3-methyl-4-cyclohexylthiophene), poly(2,5-dialkoxy-1,4-phenyleneethynylene), poly(2-decyloxy-1,4-phenylene), poly(9,9-dioctylfluorene), polyquinoline, a derivative thereof, a copolymer thereof, a sulfonated version thereof, or a combination thereof.

In some embodiments, the layer of graphene material comprises a thin film of graphene oxide sheets chemically bonded to at least one of the two opposed primary surfaces of the conductive material foil with or without using a binder or adhesive wherein at least one primary surface does not contain a layer of passivating metal oxide and wherein the thin film of graphene oxide has a thickness from 10 nm to 10 µm, an oxygen content from 0.1% to 10% by weight, an inter-graphene plane spacing of 0.335 to 0.50 nm, a physical density from 1.3 to 2.2 g/cm$^3$, all graphene oxide sheets being oriented substantially parallel to each other and parallel to the primary surfaces, exhibiting a thermal conductivity greater than 500 W/mK, and/or electrical conductivity greater than 1,500 S/cm when measured alone without the thin conductive material foil.

In certain preferred embodiments, in the cases of using a metal foil as a conductive material foil, there is no binder resin or adhesive used in the thin film GO layer itself, and there is no binder resin/adhesive or passivating metal oxide layer between the thin film GO layer and the metal foil layer.

The thin metal foil (e.g. Cu foil, Al foil, stainless steel foil, Ni foil, and Ti foil) or conductive polymer film is preferably a free standing film (not supported on another piece of metal plate, for instance) in order to reduce the film thickness and, thus, the length of pathways that electrons collected from or transferred to an electrode active material have to travel. The thin metal foil preferably has a thickness from 4 to 10 µm. Preferably, the thin film of graphene oxide or functionalized graphene has a thickness from 20 nm to 2 µm (further preferably <1 µm).

Preferably, both of the primary surfaces of a conductive material foil are each chemically bonded with a thin film of graphene oxide sheets or functionalized graphene sheets with or without using a binder or adhesive; wherein the thin film of graphene oxide or functionalized graphene has a thickness from 10 nm to 10 µm, an oxygen content from 0.1% to 10% by weight, an inter-graphene plane spacing of 0.335 to 0.50 nm, a physical density from 1.3 to 2.2 g/cm$^3$, all graphene oxide or functionalized graphene sheets are oriented substantially parallel to each other and parallel to the primary surfaces, exhibiting a thermal conductivity greater than 500 W/mK and electrical conductivity greater than 1,500 S/cm when measured alone without said thin metal foil The thin metal foil is preferably selected from Cu, Ti, Ni, stainless steel, and Al foil (including chemically etched Al foil). Chemical etching is conducted on Al foil in such a manner that the surfaces of the chemically etched Al foil have no passivating $Al_2O_3$ film commonly formed thereon prior to being bonded to the graphene oxide or functionalized graphene molecules.

We have also surprisingly observed that graphene oxide gel (GO gel containing heavily oxidized graphene molecules in an acidic medium having a pH value of 5.0 or lower, preferably and typically <3.0, and most typically <2.0) is capable of removing the passivating $Al_2O_3$ phase on Al foil surfaces. These GO molecules in a GO gel have an oxygen content typically >20% by wt., more typically >30% by wt., and most typically >40% by wt. In contrast, a simple suspension of discrete graphene or graphene oxide sheets in a liquid medium (e.g. water or an organic solvent), but not in a GO gel state, does not have this etching capability. Even heavily oxidized GO sheets, if recovered and dried from the gel state and then re-dispersed into a liquid medium, can lose this etching ability. The GO sheets, even if just slightly reduced to become reduced graphene oxide (RGO), could lose this etching power as well. These observations are truly unexpected.

In certain embodiments, the thin film of graphene oxide sheets has an oxygen content from 1% to 5% by weight. In certain other embodiments, the thin film of graphene oxide in the invented current collector has an oxygen content less than 1%, an inter-graphene spacing less than 0.345 nm, and an electrical conductivity no less than 3,000 S/cm. Preferably, in the invented current collector, the thin film of graphene oxide has an oxygen content less than 0.1%, an inter-graphene spacing less than 0.337 nm, and an electrical conductivity no less than 5,000 S/cm. Further preferably, the thin film of graphene oxide has an oxygen content no greater than 0.05%, an inter-graphene spacing less than 0.336 nm, a mosaic spread value no greater than 0.7, and an electrical conductivity no less than 8,000 S/cm.

In certain embodiments, the thin film of graphene oxide has an inter-graphene spacing less than 0.336 nm, a mosaic spread value no greater than 0.4, and an electrical conductivity greater than 10,000 S/cm. In some of the invented current collectors, the thin film of graphene oxide exhibits an inter-graphene spacing less than 0.337 nm and a mosaic spread value less than 1.0. Preferably and typically, the thin film of graphene oxide exhibits a degree of graphitization no less than 80% and/or a mosaic spread value no greater than 0.4.

The present disclosure also provides a process of producing the invented current collector. In this process, the thin film of graphene oxide sheets is obtained by depositing a graphene oxide gel onto the primary surface of the metal foil under the influence of an orientation-controlling stress that aligns the GO molecules or sheets along the primary surface plane directions and then heat-treating the deposited graphene oxide gel at a heat treatment temperature from 80° C. to 1,500° C. Preferably, the heat treatment temperature is from 80° C. to 500° C. Further preferably, the heat treatment temperature is from 80° C. to 200° C.

We have unexpectedly observed that a heat treatment temperature as low as 80° C. to 200° C. is capable of facilitating edge-to-edge merger of highly oriented GO sheets (chemical linking, extending of sheet-like molecules, or "polymerizing or chain-growing" of heavily oxidized GO molecules (from a GO gel) that have been well-aligned. Thus, in certain embodiments, the thin film of graphene oxide contains chemically bonded graphene molecules or chemically merged graphene planes that are parallel to one another.

In some embodiments, the graphene oxide gel is obtained from a graphitic material having a maximum original graphite grain size (resulting in GO sheets having a maximum length) and the thin film of graphene oxide has a grain size larger than this maximum original grain size or maximum GO length. This is a reflection of the notion that highly oriented, heavily oxidized GO sheets or molecules from a gel state are capable of edge-to-edge merging or chemical linking to form longer or wider graphene sheets or molecules.

In certain embodiments, the graphene oxide gel is produced from particles of a natural graphite or artificial graphite composed of graphite crystallites having an initial length $L_a$ in the crystallographic a-axis direction, an initial width $L_b$ in the b-axis direction, and a thickness $L_c$ in the c-axis direction, and the thin film of graphene oxide has a graphene domain or crystal length or width greater than the initial $L_a$ and $L_b$ of the graphite crystallites.

Typically, the thin film of graphene oxide contains graphene planes having a combination of $sp^2$ and $sp^3$ electronic configurations. Preferably, the thin film of graphene oxide is a continuous length film having a length no less than 5 cm (preferably no less than 10 cm and further preferably no less than 20 cm) and a width no less than 1 cm (preferably no less than 10 cm). There are no practical limitations on the length and width of the continuous-length thin film of graphene oxide herein invented.

In certain embodiments, the thin film of graphene oxide, when measured alone, has a physical density greater than 1.8 g/cm3, and/or a tensile strength greater than 40 MPa; preferably having a physical density greater than 1.9 g/cm3, and/or a tensile strength greater than 60 MPa and more preferably having a physical density greater than 2.0 g/cm$^3$, and/or a tensile strength greater than 80 MPa.

The present disclosure also provides a rechargeable lithium battery containing at least two bi-polar electrodes that are physically stacked together and electrically connected in series. In this configuration, the anode layer (herein referred to as the first anode layer) coated on one primary surface of a current collector (referred to as the first current collector) faces the cathode layer (the second cathode layer) coated on one primary surface of a neighboring current collector (the second current collector, wherein a porous separator and/or a layer of solid or semi-solid electrolyte is sandwiched between the first anode layer and the second cathode layer. The rechargeable lithium battery may be a lithium-ion battery, a lithium-sulfur battery, a lithium-selenium battery, a lithium sulfur/selenium battery, a lithium-air battery, a sodium-ion battery, a sodium metal battery, a zinc-ion battery, a zinc metal battery, a Zn—Ni battery, an aluminum-ion battery, an aluminum metal battery, a magnesium-ion battery, or a magnesium metal battery.

The present disclosure also provides a capacitor containing at least two bi-polar electrodes that are physically stacked together and electrically connected in series, which capacitor is a symmetric ultracapacitor, an asymmetric ultracapacitor, a hybrid supercapacitor-battery device, or a lithium-ion capacitor.

Preferably, the electrolyte implemented in the presently disclosed battery or supercapacitor contains non-flowable (not fluid like) electrolyte that does not easily flow around to permeate from one cell to another cell. The suitable electrolyte may be selected from polymer gel electrolyte, polymer electrolyte, inorganic solid-state electrolyte, quasi-solid electrolyte (e.g. having a lithium salt concentration in liquid solvent higher than 3.0 M), or composite electrolyte.

The present disclosure also provides a process for producing a bi-polar electrode for a battery or capacitor, the process comprising: (a) providing a conductive material foil having a thickness from 10 nm to 100 μm and two opposing parallel primary surfaces and coating one or both of the primary surfaces with a layer of graphene material having a thickness from 5 nm to 50 μm to form a graphene-coated current collector; and (b) depositing a negative electrode layer and a positive electrode layer onto two opposing primary surfaces of the graphene-coated current collector, wherein the negative electrode layer is in physical contact with the layer of graphene material or directly with a primary surface of the conductive material foil and the positive electrode layer is in physical contact with the layer of graphene material or directly with the opposing primary surface of the conductive material foil. The negative electrode and the positive electrode deposited on the two opposing primary surfaces of the same current collector have different compositions or structures.

In certain embodiments, the procedure of coating one or both of the primary surfaces with a layer of graphene material comprises forming a layer of an aggregate of multiple oriented/aligned graphene sheets that are substantially parallel to one another.

The process coating procedure may comprise dispersing multiple graphene sheets in a matrix material or bonding the multiple graphene sheets by a binder material to form the layer of graphene material, and/or chemically bonding the layer of graphene material to the conductive material foil.

The multiple graphene sheets may contain single-layer or few-layer graphene sheets selected from a pristine graphene material having essentially zero % of non-carbon elements, or a non-pristine graphene material having 0.001% to 25% by weight of non-carbon elements wherein said non-pristine graphene is selected from graphene oxide, reduced graphene oxide, graphene fluoride, graphene chloride, graphene bromide, graphene iodide, hydrogenated graphene, nitrogenated graphene, doped graphene, chemically functionalized graphene, or a combination thereof.

In some embodiments, the procedure of forming a layer of an aggregate of multiple oriented/aligned graphene sheets comprises a procedure selected from air-assisted or liquid-assisted spraying of the multiple graphene sheets.

Preferably, the procedure of forming a layer of an aggregate of multiple oriented/aligned graphene sheets comprises forming a graphene dispersion containing multiple graphene sheets, followed by a procedure selected from coating, casting, spraying, printing, forced assembling and orienting procedure, or a combination thereof.

The coating procedure may be selected from vapor deposition, chemical coating, electrochemical coating or plating, spray-coating, painting, brushing, printing, roll-to-roll coating, physical coating, or a combination thereof.

The roll-to-roll coating may be selected from air knife coating, Anilox coating, Flexo coating, gap coating or knife-over-roll coating, gravure coating, hot melt coating, immersion dip coating, kiss coating, metering rod or Meyer bar coating, roller coating, silk screen coating or rotary screen coating, slot-die coating, extrusion coating, screen printing, or a combination thereof.

The process may further comprise a step of compressing the layer of graphene material to an extent that the multiple graphene sheets are substantially aligned to be parallel to one another.

In certain embodiments, step (a) of the process comprises catalyst-assisted chemical vapor deposition (CVD). This can be accomplished by introducing a carbon source vapor (e.g. hydrocarbon gas such as acetylene, methane, and naphthalene) onto the surfaces of a catalytic transition metal foil (e.g. Cu, Ni, Fe, etc.) at a sufficiently high CVD temperature (typically from 400° C. to 1,500° C. and more typically from 600° C. to 1,200° C.). For less catalytic or non-catalytic metal foils (e.g. Zn and Al), one may deposit a thin layer (1 nm to 5 μm) of a catalytic transition metal (e.g. Cu, Ni, Fe, Ti, Mn, Co, etc.) onto the surfaces of the foil prior to introducing the carbon source vapor.

In some embodiments, step (a) of the disclosed process comprises (i) dispersing multiple graphene sheets in a liquid medium to form a suspension (optionally containing an adhesive resin dispersed or dissolved therein), (ii) dispensing and depositing the suspension onto a surface of a substrate to form a wet aggregate of graphene sheets, and (iii) partially or completely removing the liquid medium from the wet aggregate to form the aggregate of multiple graphene sheets.

Preferably, the suspension comprises an adhesive resin dispersed or dissolved therein. The procedure may comprise a step of curing the adhesive resin or simply solidifying the adhesive resin by removing the liquid solvent used to dissolve the resin.

The process may further comprise a procedure of compressing or consolidating the aggregate to align said multiple graphene sheets and/or to reduce porosity in said aggregate.

In some embodiments, step (a) comprises spraying multiple graphene sheets, with or without a dispersing liquid medium and with or without an adhesive resin, onto a solid substrate surface to form an aggregate of multiple graphene sheets. The process may further comprise a procedure of compressing or consolidating the aggregate to align multiple graphene sheets and/or to reduce porosity in said aggregate or cluster.

In some embodiments, the process further comprises a procedure for heat-treating the aggregate layer of multiple graphene sheets, after procedure (a), at a temperature or multiple different temperatures selected from 50° C. to 3,200° C. The maximum temperature cannot be higher than the melting point or degradation temperature of the conductive material foil. The process may further comprise a procedure, after heat-treating, for compressing or consolidating the aggregate of multiple graphene sheets.

The process may further comprise implementing multiple bi-polar electrodes as herein defined to form a bi-polar battery or bi-polar capacitors.

DETAILED DESCRIPTION OF PREFERRED EMBODIMENTS

Figure 1A:
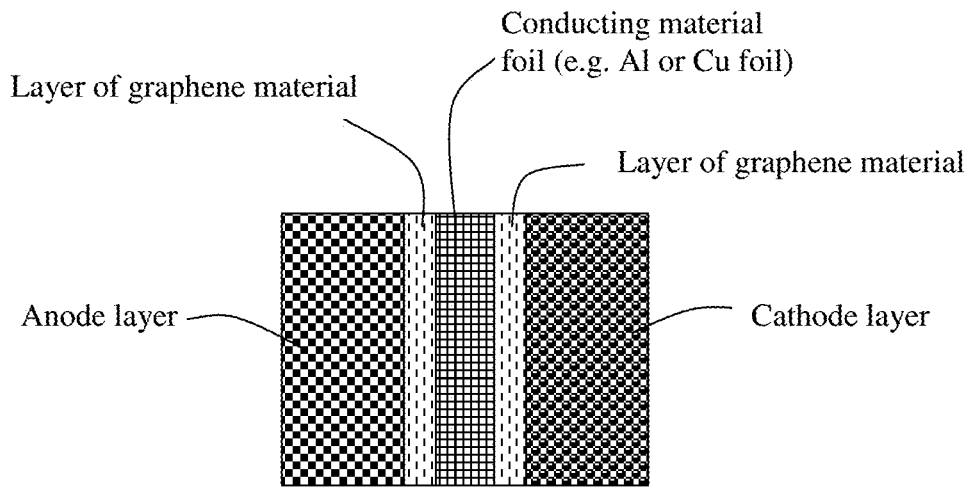
FIG. 1(A) Schematic drawing of a bi-polar electrode according to certain embodiments of the present disclosure (two graphene material layers coated on the two opposite surfaces of a conductive current collector foil.
Figure 1B:
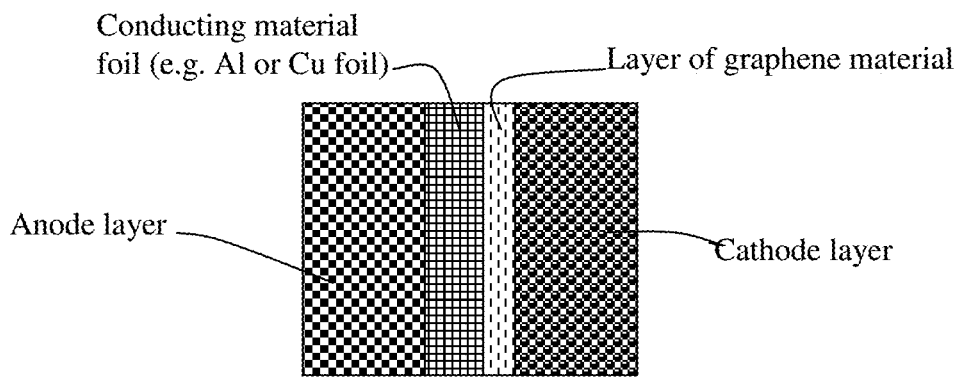
FIG. 1 (B) Schematic drawing showing certain embodiments wherein a layer of graphene material is coated on a primary surface of a conductive material foil and is sandwiched between this conductive material foil and a cathode (positive electrode) layer.
FIG. 1(C) Schematic drawing showing certain embodiments wherein a layer of graphene material is coated on a primary surface of a conductive material foil and is sandwiched between this conductive material foil and an anode (negative electrode) layer.
Figure 1C:
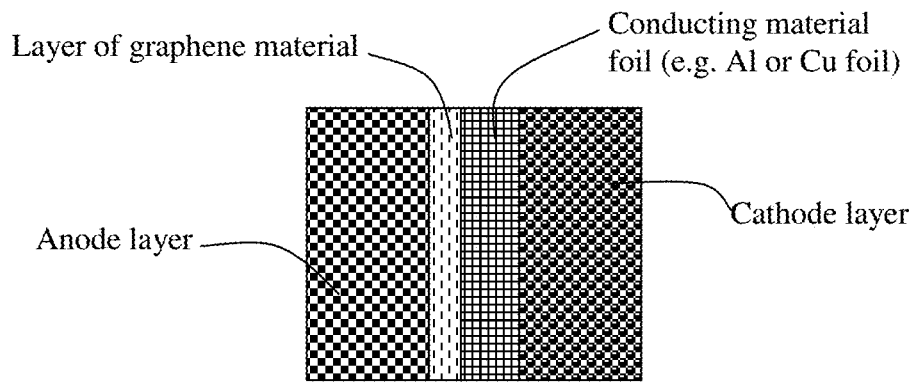

In certain embodiments, as schematically illustrated in FIG. 1(A), FIG. 1(B), and FIG. 1(C), the present disclosure provides a bi-polar electrode for a battery or capacitor, wherein the bi-polar electrode comprises: (A) a current collector comprising a conductive material foil (e.g. metal foil or conducting polymer film) having a thickness from 10 nm to 100 μm and two opposing, parallel primary surfaces, wherein one or both of the primary surfaces is coated with a layer of graphene material having a thickness from 5 nm to 50 μm (preferably less than 10 μm, and further preferably less than 1 μm); and (B) a negative electrode layer (anode) and a positive electrode layer (cathode) respectively disposed on the two opposing sides of the current collector, each in physical contact with the layer of graphene material or directly with a primary surface (if no graphene material coated thereon) of the conductive material foil. The negative electrode layer and the positive electrode layer coated on the two opposing surfaces of a current collector are different in composition or structure.

Preferably, as illustrated in FIG. 1(A), both of the primary surfaces of the conducting material foil (e.g. Cu foil, Al foil, stainless steel foil, etc.) of the current collector are each coated with a layer of graphene material and the negative electrode layer is physically attached or chemically bonded to the one layer of graphene material and the positive electrode layer is physically attached or chemically bonded to the other layer of graphene material. In other words, a graphene material layer is sandwiched between an anode layer and the conductive material foil and another graphene material layer is sandwiched between a cathode layer and the same conductive material foil (on the opposing side).

FIG. 1(B) shows certain embodiments wherein a layer of graphene material is coated on a primary surface of a conductive material foil and is sandwiched between this conductive material foil and a cathode (positive electrode) layer. FIG. 1(C) shows certain embodiments wherein a layer of graphene material is coated on a primary surface of a conductive material foil and is sandwiched between this conductive material foil and an anode (negative electrode) layer.

The typical cell construction of a prior art lithium-ion battery cell has porous positive electrode materials coated on both sides of a thin aluminum foil and porous negative electrode materials coated onto both sides of a thin copper foil. These coated foils are stacked and electrically insulated by thin porous polymer separator materials. The closely stacked foils and films contain a liquid electrolyte that has a lithium ion-producing salt dissolved therein that facilitate the back and forth movement of lithium ions during charge and discharge. Multiple positive and negative electrodes typically form a cell stack and respective negative and positive electrodes are electrically joined by welding through extra metal material protruding from the foils. In addition, a single thicker like-metal is welded to each electrode protrusion weld to collect and bring each of the two opposing electric current connections outside of the cell.

Figure 3:
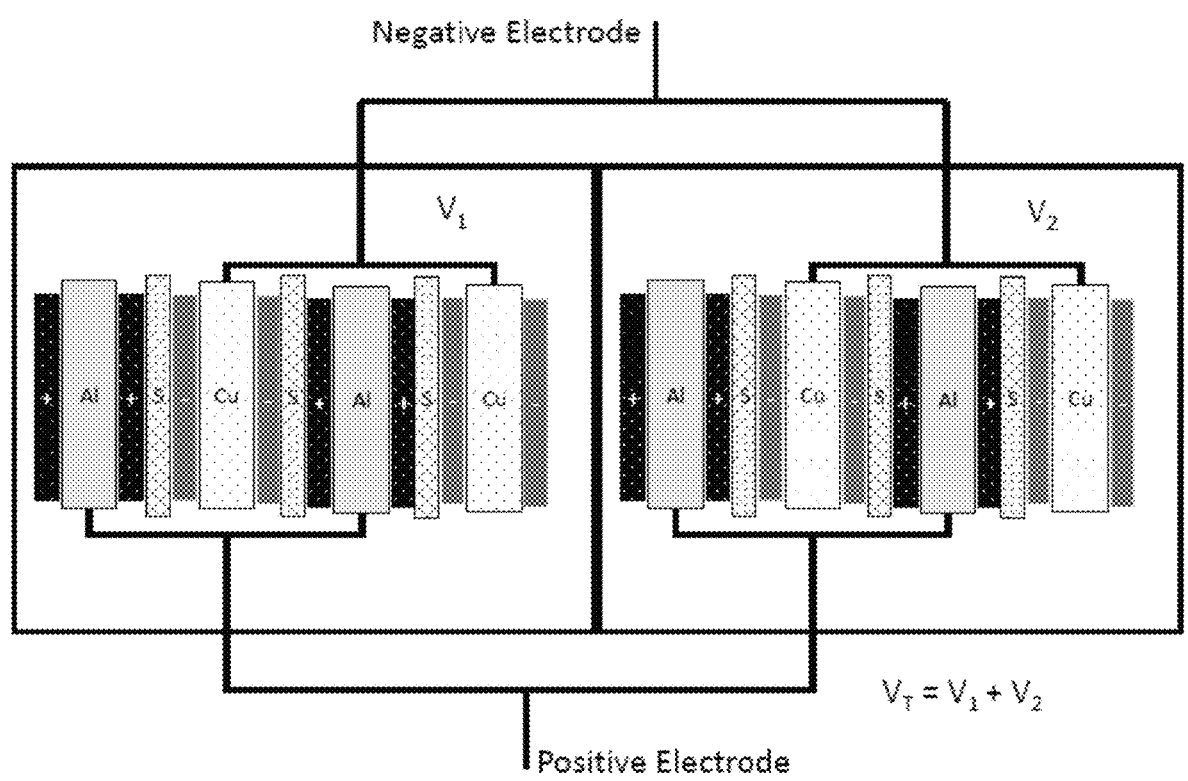
FIG. 3 A conventional configuration of two battery cells connected in series (separator is denoted as S, positive electrode as +, and negative electrode as – in the diagram).

In a conventional battery application, multiple cells are joined in series to build higher voltage units and/or in parallel to build higher charge capacity units. It is important to note that these connections result in significant weight and volume overhead added to the battery. FIG. 3 depicts a simple series configuration of cells.

Again, using the lithium-ion battery as an example, the conductive foil materials used as a current collector for the positive and negative electrodes are chosen due to their respective resistance to reactivity at the positive and negative electrodes of a cell. Aluminum (Al) is typically used as the current collector for the positive electrode as it is generally resistant to positive electrode oxidative potentials. However, aluminum is not used as a negative electrode current collector material due to its propensity to form an alloy with lithium at most negative electrode reductive potentials. Instead, copper (Cu) is typically used as a negative electrode material as it does not alloy with lithium and is generally resistant to reduction at negative electrode potentials. Copper is not used as a positive electrode material as it is about 3 times denser that aluminum (adding weight to the cell—reducing specific energy), relatively expensive and has a propensity to oxidize at positive electrode potentials.

Figure 4:
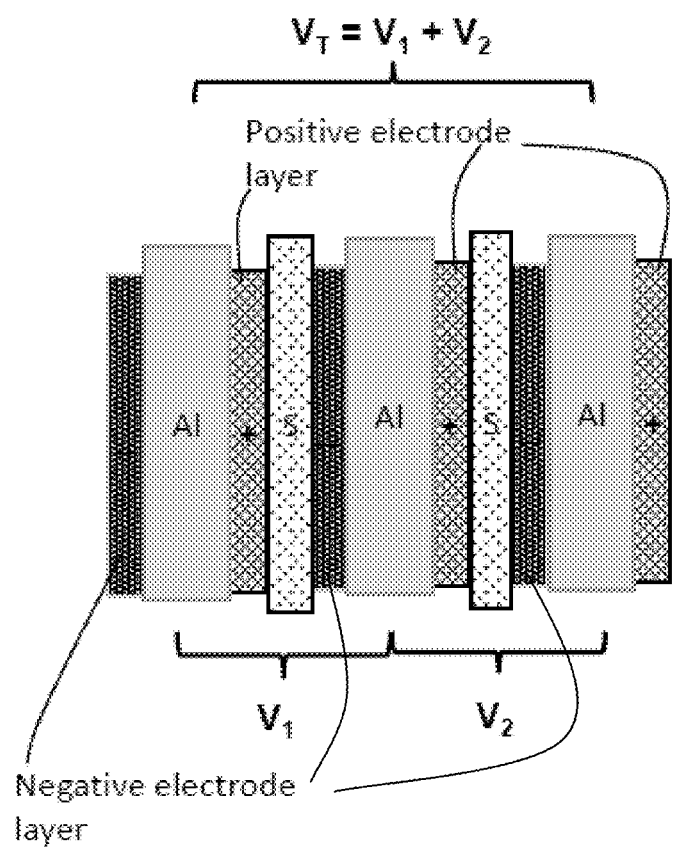
FIG. 4 Two bi-polar electrode-based battery unit cells connected in series; layers of graphene material not present.

An alternative battery cell architecture is depicted in FIG. 4, wherein two unit cells are electrically connected in series (plus an extra positive electrode layer at the right end and an extra negative electrode layer at the left end of the chart). In this architecture, the positive and negative electrode materials are coated onto opposite sides of the same current collector foil creating an equipotential bipolar electrode (also referred to as a bipolar plate). In a battery, these bipolar electrodes are stacked negative material sides facing positive material sides with opposing sides insulated by porous separators. When electrolyte is added to a battery composed of stacked bipolar electrodes, electric fields are created such that the battery voltage—as measured at the termination bipolar plates—is the sum of the individual voltages of each facing positive and negative materials pair. Thusly, much higher single-unit voltages ($V_T=V_1+V_2$) can be realized with significant savings in materials, volume and weight of cell-to-cell connectors and elimination of most welds necessary for the typical-cell-architecture based applications. Much greater energy density and specific energy can be achieved at lower costs as compared to applications using the typical cell design. Much lower internal impedance is also realized as electron currents of the bipolar plates inside the stack are confined and distributed perpendicular to the plates and over the plate's entire area and not passed from plate-to-plate through the foil protrusions as in the typical (conventional) case. This also leads to a more uniform materials electrochemical utilization than the typical cell design case tending to extend cell cycle life.

It may be noted that this bi-polar electrode battery configuration will work only if the electrolyte in one unit cell (comprising an anode layer and a cathode layer sandwiching a porous separator) does not permeate into a neighboring cell. Thus, the electrolyte implemented in the presently disclosed battery or supercapacitor contains non-flowable (not fluid like) electrolyte that does not easily flow around to permeate from one cell to another cell. The suitable electrolyte may be selected from polymer gel electrolyte, polymer electrolyte, inorganic solid-state electrolyte, quasi-solid electrolyte (e.g. having a lithium salt concentration in liquid solvent higher than 3.0 M), or composite electrolyte.

Figure 5:
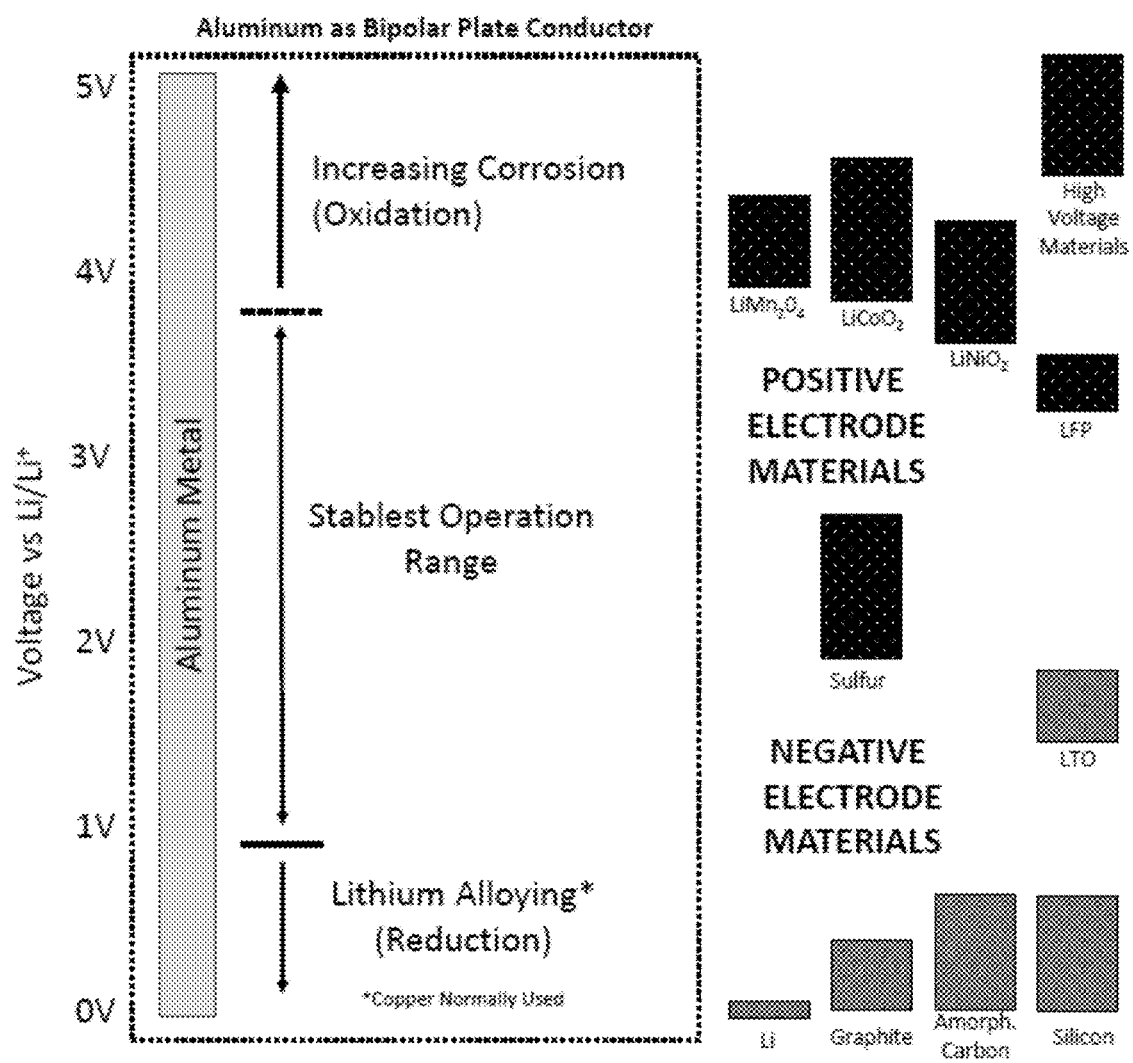
FIG. 5 The relative ranges of aluminum oxidative and reductive (alloying) behavior compared to relative oxidative and reductive potentials of some commonly encountered positive and negative electrode materials.

However, there is a difficulty in realizing a practical bipolar configuration in terms of the oxidative, reductive and alloying natures of the electrode metals discussed above. In the bipolar cell case, only a single metal type is necessary. Between copper and aluminum, aluminum would be the metal of choice for coating the electrode materials due to its much lower specific gravity and significant lower cost. FIG. 5 depicts the relative ranges of aluminum oxidative and reductive (alloying) behavior compared to relative oxidative and reductive potentials of some commonly encountered positive and negative electrode materials.

Figure 6:
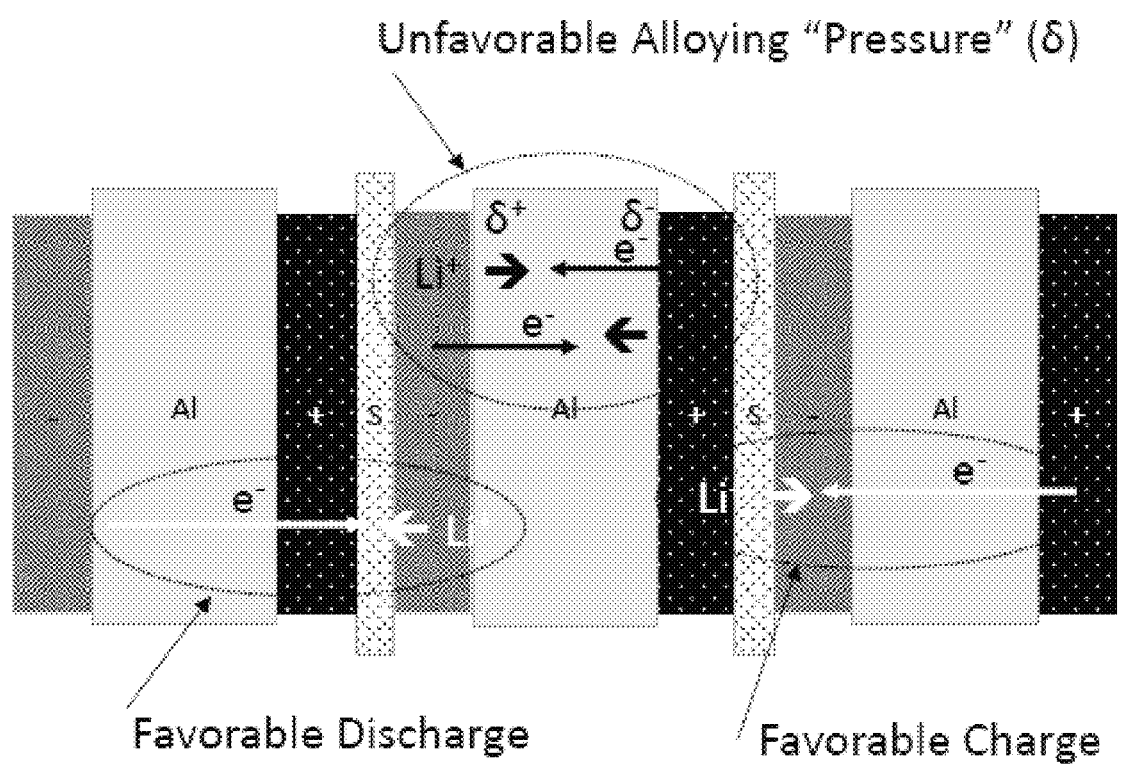
FIG. 6 The voltage-delta chemical-potential creates a "pressure" or driving force for a lithium alloying process to occur.

In a bipolar battery configuration, and even though the coated bipolar plate is an equipotential entity, the electric field permeating the plate will create a delta of chemical potential across the plate whose magnitude is proportional to the difference in oxidative and reductive potentials of the positive/negative material pair chosen as a coating on the opposing surfaces of the bipolar conductor foil. As depicted in FIG. 6, the voltage-delta chemical-potential creates a "pressure" or driving force for a lithium alloying process to occur. Even when the conductive current collector foil is made of other metals than Al or conductive polymers, this driving force may induce undesirable interaction between lithium ions and the current collector layer (e.g. simple diffusion of lithium ions through the foil.

This alloying potential may be kinetically hindered but becomes more thermodynamically favored at higher deltas. In all cases the alloying reaction will occur to a greater or lesser degree in addition to corrosive behavior as presented by some of the more oxidative positive materials. Thus, in the case of lithium titanate (LTO) and lithium iron phosphate (LFP) coatings, we should expect less alloying activity as compared to graphite and $LiCoO_2$ coatings, for example. In any case, protection against alloying and corrosive reactions on the bipolar conductor is necessary.

We have discovered that one can eliminate this lithium alloying process or other undesirable reactions between the conductive material foil (current collector layer) and lithium ions provided that at least a layer of graphene material is implemented on at least a primary surface of a conductive material foil (preferably each of the two opposing surfaces of this foil is coated with a layer of graphene material, as illustrated in FIG. 1(A), FIG. 1(B), and FIG. 1(C). The thickness of the layer of graphene material is more preferably from 10 nm to 10 µm, further preferably less than 3 µm, and most preferably from 30 nm to 1 µm.

In the bi-polar electrode herein disclosed, the graphene material preferably contains graphene sheets selected from pristine graphene, oxidized graphene, reduced graphene oxide, fluorinated graphene, graphene bromide, graphene chloride, graphene iodide, hydrogenated graphene, nitrogenated graphene, doped graphene, chemically functionalized graphene, or a combination thereof.

These graphene sheets may be dispersed in a matrix material or bonded by a binder material. The layer of graphene material may be chemically bonded to the conductive material foil.

Preferably, the layer of graphene material contains graphene sheets that are aligned to be substantially parallel to one another having an average angle between graphene sheets less than 15 degrees (preferably less than 10 degrees and more preferably less than 5 degrees). Preferably, these aligned graphene sheets are substantially parallel to the primary surface plane of the conductive material foil.

In certain embodiments, the conductive material foil is selected from a metal, an electrically conductive polymer, or a combination thereof. The metal may be selected from Mg, Al, Sn, Sb, Ti, V, Cr, Mn, Fe, Co, Ni, Cu, Zn, Cd, Ag, Pd, Mo, Nb, Zr, Au, Pt, W, Ta, an alloy thereof, or a combination thereof. Preferably, the surfaces of these metal foils do not have a passivating layer, such as a metal oxide film (e.g. aluminum oxide naturally occurring on aluminum metal surface as soon as a fresh Al metal surface is exposed to oxygen).

In certain embodiments, the electrically conductive polymer used to make the conductive material foil comprises a conjugated polymer selected from polyacetylene, polythiophene, poly(3-alkylthiophenes), polypyrrole, polyaniline, poly(isothianaphthene), poly(3,4-ethylene dioxythiophene), alkoxy-substituted poly(p-phenylene vinylene), poly(2,5-bis (cholestanoxy) phenylene vinylene), poly(p-phenylene vinylene), poly(2,5-dialkoxy) paraphenylene vinylene, poly [(1,4-phenylene-1,2-diphenylvinylene)], poly(3',7'-dimethyloctyloxy phenylene vinylene), polyparaphenylene, polyparaphenylene, polyparaphenylene sulphide, polyheptadiyne, poly(3-hexylthiophene), poly(3-octylthiophene), poly(3-cyclohexylthiophene), poly(3-methyl-4-cyclohexylthiophene), poly(2,5-dialkoxy-1,4-phenyleneethynylene), poly(2-decyloxy-1,4-phenylene), poly(9,9-dioctylfluorene), polyquinoline, a derivative thereof, a copolymer thereof, a sulfonated version thereof, or a combination thereof. Polymers can be made into thin films or foils using various known methods.

The production of graphene materials is now briefly described as follows:

Bulk natural flake graphite is a 3-D graphitic material with each particle being composed of multiple grains (a grain being a graphite single crystal or crystallite) with grain boundaries (amorphous or defect zones) demarcating neighboring graphite single crystals. Each grain is composed of multiple graphene planes that are oriented parallel to one another. A graphene plane in a graphite crystallite is composed of carbon atoms occupying a two-dimensional, hexagonal lattice. In a given grain or single crystal, the graphene planes are stacked and bonded via van der Waal forces in the crystallographic c-direction (perpendicular to the graphene plane or basal plane). Although all the graphene planes in one grain are parallel to one another, typically the graphene planes in one grain and the graphene planes in an adjacent grain are different in orientation. In other words, the orientations of the various grains in a graphite particle typically differ from one grain to another.

The constituent graphene planes (typically 30 nm-2 μm wide/long) of a graphite crystallite can be exfoliated and extracted or isolated from the graphite crystallite to obtain individual graphene sheets of carbon atoms provided the inter-planar van der Waals forces can be overcome. An isolated, individual graphene sheet of hexagonal carbon atoms is commonly referred to as single-layer graphene. A stack of multiple graphene planes bonded through van der Waals forces in the thickness direction with an inter-graphene plane spacing of 0.3354 nm is commonly referred to as a multi-layer graphene. A multi-layer graphene platelet has up to 300 layers of graphene planes (<100 nm in thickness), but more typically up to 30 graphene planes (<10 nm in thickness), even more typically up to 20 graphene planes (<7 nm in thickness), and most typically up to 10 graphene planes (commonly referred to as few-layer graphene in scientific community). Single-layer graphene and multi-layer graphene sheets are collectively called "nano graphene platelets" (NGPs). Graphene sheets/platelets or NGPs are a new class of carbon nano material (a 2-D nano carbon) that is distinct from the 0-D fullerene, the 1-D CNT, and the 3-D graphite.

Our research group pioneered the development of graphene materials and related production processes as early as 2002: (1) B. Z. Jang and W. C. Huang, "Nano-scaled Graphene Plates," U.S. Pat. No. 7,071,258 (Jul. 4, 2006), application submitted on Oct. 21, 2002; (2) B. Z. Jang, et al. "Process for Producing Nano-scaled Graphene Plates," U.S. patent application Ser. No. 10/858,814 (Jun. 3, 2004) (U.S. Pat. Pub. No. 2005/0271574) (now abandoned); and (3) B. Z. Jang, A. Zhamu, and J. Guo, "Process for Producing Nano-scaled Platelets and Nanocomposites," U.S. patent application Ser. No. 11/509,424 (Aug. 25, 2006) (U.S. Pat. Pub. No. 2008/0048152) (now abandoned).

Figure 2:
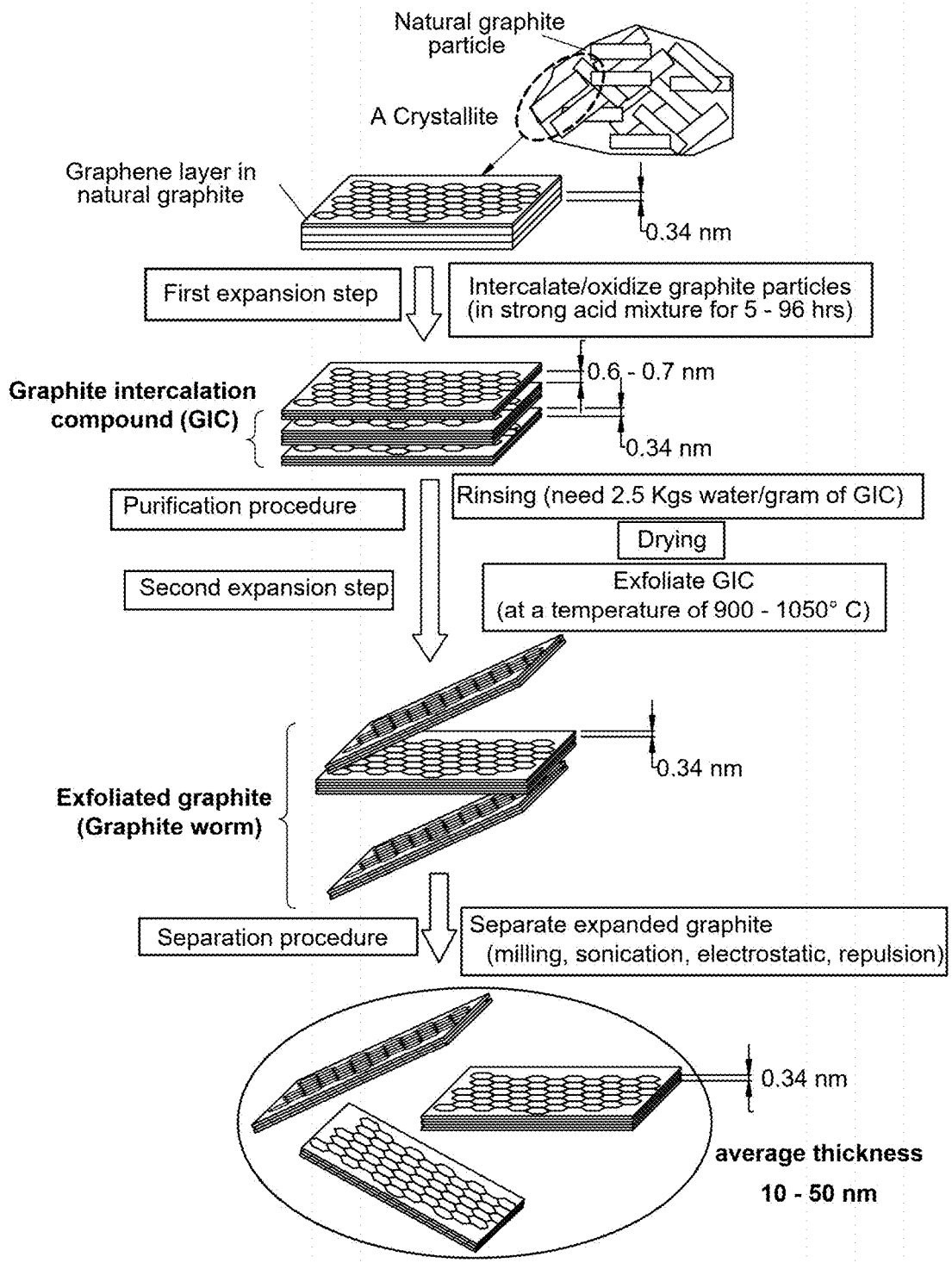
FIG. 2 A process for producing graphene oxide or reduced graphene oxide sheets from oxidized graphite or intercalated graphite.

A highly useful approach (FIG. 2) entails treating natural graphite powder with an intercalant and an oxidant (e.g., concentrated sulfuric acid and nitric acid, respectively) to obtain a graphite intercalation compound (GIC) or, actually, graphite oxide (GO). [William S. Hummers, Jr., et al., Preparation of Graphitic Oxide, Journal of the American Chemical Society, 1958, p. 1339.] Prior to intercalation or oxidation, graphite has an inter-graphene plane spacing of approximately 0.335 nm ($L_d = ½ d_{002} = 0.335$ nm). With an intercalation and oxidation treatment, the inter-graphene spacing is increased to a value typically greater than 0.6 nm. This is the first expansion stage experienced by the graphite material during this chemical route. The obtained GIC or GO is then subjected to further expansion (often referred to as exfoliation) using either a thermal shock exposure or a solution-based, ultrasonication-assisted graphene layer exfoliation approach.

It may be noted that if natural graphite powder is dispersed in an oxidant (e.g., a mixture of concentrated sulfuric acid and nitric acid or potassium permanganate) for a sufficient period of time one can obtain a GO material having an oxygen content greater than 30% by weight (preferably >35%), which can be formed into a GO gel state via water rinsing and mechanical shearing.

In the thermal shock exposure approach, the GIC or GO is exposed to a high temperature (typically 800-1,050° C.) for a short period of time (typically 15 to 60 seconds) to exfoliate or expand the GIC or GO for the formation of exfoliated or further expanded graphite, which is typically in the form of a "graphite worm" composed of graphite flakes that are still interconnected with one another. This thermal shock procedure can produce some separated graphite flakes or graphene sheets, but normally the majority of graphite flakes remain interconnected. Typically, the exfoliated graphite or graphite worm is then subjected to a flake separation treatment using air milling, mechanical shearing, or ultrasonication in water. Hence, approach 1 basically entails three distinct procedures: first expansion (oxidation or intercalation), further expansion (or "exfoliation"), and separation.

In the solution-based separation approach, the expanded or exfoliated GO powder is dispersed in water or aqueous alcohol solution, which is subjected to ultrasonication. It is important to note that in these processes, ultrasonification is used after intercalation and oxidation of graphite (i.e., after first expansion) and typically after thermal shock exposure of the resulting GIC or GO (after second expansion). Alternatively, the GO powder dispersed in water is subjected to an ion exchange or lengthy purification procedure in such a manner that the repulsive forces between ions residing in the inter-planar spaces overcome the inter-graphene van der Waals forces, resulting in graphene layer separations.

In the aforementioned examples, the starting material for the preparation of graphene sheets or NGPs is a graphitic material that may be selected from the group consisting of natural graphite, artificial graphite, graphite oxide, graphite fluoride, graphite fiber, carbon fiber, carbon nano-fiber, carbon nano-tube, mesophase carbon micro-bead (MCMB) or carbonaceous micro-sphere (CMS), soft carbon, hard carbon, and combinations thereof.

Graphite oxide may be prepared by dispersing or immersing a laminar graphite material (e.g., powder of natural flake graphite or synthetic graphite) in an oxidizing agent, typically a mixture of an intercalant (e.g., concentrated sulfuric acid) and an oxidant (e.g., nitric acid, hydrogen peroxide, sodium perchlorate, potassium permanganate) at a desired temperature (typically 0-70° C.) for a sufficient length of time (typically 4 hours to 5 days). The resulting graphite oxide particles are then rinsed with water several times to adjust the pH values to typically 2-5. The resulting suspension of graphite oxide particles dispersed in water is then subjected to ultrasonication to produce a dispersion of separate graphene oxide sheets dispersed in water. A small amount of reducing agent (e.g. $Na_4B$) may be added to obtain reduced graphene oxide (RDO) sheets.

In order to reduce the time required to produce a precursor solution or suspension, one may choose to oxidize the graphite to some extent for a shorter period of time (e.g., 30 minutes-4 hours) to obtain graphite intercalation compound (GIC). The GIC particles are then exposed to a thermal shock, preferably in a temperature range of 600-1,100° C. for typically 15 to 60 seconds to obtain exfoliated graphite or graphite worms, which are optionally (but preferably) subjected to mechanical shearing (e.g. using a mechanical shearing machine or an ultrasonicator) to break up the graphite flakes that constitute a graphite worm. Either the already separated graphene sheets (after mechanical shearing) or the un-broken graphite worms or individual graphite flakes are then re-dispersed in water, acid, or organic solvent and ultrasonicated to obtain a graphene dispersion.

The pristine graphene material is preferably produced by one of the following three processes: (A) Intercalating the graphitic material with a non-oxidizing agent, followed by a thermal or chemical exfoliation treatment in a non-oxidizing environment; (B) Subjecting the graphitic material to a supercritical fluid environment for inter-graphene layer penetration and exfoliation; or (C) Dispersing the graphitic material in a powder form to an aqueous solution containing a surfactant or dispersing agent to obtain a suspension and subjecting the suspension to direct ultrasonication to obtain a graphene dispersion.

In Procedure (A), a particularly preferred step comprises (i) intercalating the graphitic material with a non-oxidizing agent, selected from an alkali metal (e.g., potassium, sodium, lithium, or cesium), alkaline earth metal, or an alloy, mixture, or eutectic of an alkali or alkaline metal; and (ii) a chemical exfoliation treatment (e.g., by immersing potassium-intercalated graphite in ethanol solution).

In Procedure (B), a preferred step comprises immersing the graphitic material to a supercritical fluid, such as carbon dioxide (e.g., at temperature T>31° C. and pressure P>7.4 MPa) and water (e.g., at T>374° C. and P>22.1 MPa), for a period of time sufficient for inter-graphene layer penetration (tentative intercalation). This step is then followed by a sudden de-pressurization to exfoliate individual graphene layers. Other suitable supercritical fluids include methane, ethane, ethylene, hydrogen peroxide, ozone, water oxidation (water containing a high concentration of dissolved oxygen), or a mixture thereof.

In Procedure (C), a preferred step comprises (a) dispersing particles of a graphitic material in a liquid medium containing therein a surfactant or dispersing agent to obtain a suspension or slurry; and (b) exposing the suspension or slurry to ultrasonic waves (a process commonly referred to as ultrasonication) at an energy level for a sufficient length of time to produce a graphene dispersion of separated graphene sheets (non-oxidized NGPs) dispersed in a liquid medium (e.g. water, alcohol, or organic solvent).

NGPs can be produced with an oxygen content no greater than 25% by weight, preferably below 20% by weight, further preferably below 5%. Typically, the oxygen content is between 5% and 20% by weight. The oxygen content can be determined using chemical elemental analysis and/or X-ray photoelectron spectroscopy (XPS). When the oxygen content of graphene oxide exceeds 30% by weight (more typically when >35%), the GO molecules dispersed or dissolved in water for a GO gel state.

The laminar graphite materials used in the prior art processes for the production of the GIC, graphite oxide, and subsequently made exfoliated graphite, flexible graphite sheets, and graphene platelets were, in most cases, natural graphite. However, the present disclosure is not limited to natural graphite. The starting material may be selected from the group consisting of natural graphite, artificial graphite (e.g., highly oriented pyrolytic graphite, HOPG), graphite oxide, graphite fluoride, graphite fiber, carbon fiber, carbon nano-fiber, carbon nano-tube, mesophase carbon micro-bead (MCMB) or carbonaceous micro-sphere (CMS), soft carbon, hard carbon, and combinations thereof. All of these materials contain graphite crystallites that are composed of layers of graphene planes stacked or bonded together via van der Waals forces. In natural graphite, multiple stacks of graphene planes, with the graphene plane orientation varying from stack to stack, are clustered together. In carbon fibers, the graphene planes are usually oriented along a preferred direction. Generally speaking, soft carbons are carbonaceous materials obtained from carbonization of liquid-state, aromatic molecules. Their aromatic ring or graphene structures are more or less parallel to one another, enabling further graphitization. Hard carbons are carbonaceous materials obtained from aromatic solid materials (e.g., polymers, such as phenolic resin and polyfurfuryl alcohol). Their graphene structures are relatively randomly oriented and, hence, further graphitization is difficult to achieve even at a temperature higher than 2,500° C. But, graphene sheets do exist in these carbons.

Fluorinated graphene or graphene fluoride is herein used as an example of the halogenated graphene material group. There are two different approaches that have been followed to produce fluorinated graphene: (1) fluorination of pre-synthesized graphene: This approach entails treating graphene prepared by mechanical exfoliation or by CVD growth with fluorinating agent such as $XeF_2$, or F-based plasmas; (2) Exfoliation of multilayered graphite fluorides: Both mechanical exfoliation and liquid phase exfoliation of graphite fluoride can be readily accomplished [F. Karlicky, et al. "*Halogenated Graphenes: Rapidly Growing Family of Graphene Derivatives*" ACS Nano, 2013, 7 (8), pp 6434-6464].

Interaction of $F_2$ with graphite at high temperature leads to covalent graphite fluorides $(CF)_n$ or $(C_2F)_n$, while at low temperatures graphite intercalation compounds (GIC) $C_xF$ (2≤x≤24) form. In $(CF)_n$ carbon atoms are sp3-hybridized and thus the fluorocarbon layers are corrugated consisting of trans-linked cyclohexane chairs. In $(C_2F)_n$ only half of the C atoms are fluorinated and every pair of the adjacent carbon sheets are linked together by covalent C—C bonds. Systematic studies on the fluorination reaction showed that the resulting F/C ratio is largely dependent on the fluorination temperature, the partial pressure of the fluorine in the fluorinating gas, and physical characteristics of the graphite precursor, including the degree of graphitization, particle size, and specific surface area. In addition to fluorine ($F_2$), other fluorinating agents may be used, although most of the available literature involves fluorination with $F_2$ gas, sometimes in presence of fluorides.

For exfoliating a layered precursor material to the state of individual single graphene layers or few-layers, it is necessary to overcome the attractive forces between adjacent layers and to further stabilize the layers. This may be achieved by either covalent modification of the graphene surface by functional groups or by non-covalent modification using specific solvents, surfactants, polymers, or donor-acceptor aromatic molecules. The process of liquid phase exfoliation includes ultra-sonic treatment of a graphite fluoride in a liquid medium to produce graphene fluoride sheets dispersed in the liquid medium. The resulting dispersion can be directly used in the graphene deposition of polymer component surfaces.

The nitrogenation of graphene can be conducted by exposing a graphene material, such as graphene oxide, to ammonia at high temperatures (200-400° C.). Nitrogenated graphene could also be formed at lower temperatures by a hydrothermal method; e.g. by sealing GO and ammonia in an autoclave and then increased the temperature to 150-250° C. Other methods to synthesize nitrogen doped graphene include nitrogen plasma treatment on graphene, arc-discharge between graphite electrodes in the presence of ammonia, ammonolysis of graphene oxide under CVD conditions, and hydrothermal treatment of graphene oxide and urea at different temperatures.

For the purpose of defining the claims of the instant application, NGPs or graphene materials include discrete sheets/platelets of single-layer and multi-layer (typically less than 10 layers, the few-layer graphene) pristine graphene, graphene oxide, reduced graphene oxide (RGO), graphene fluoride, graphene chloride, graphene bromide, graphene iodide, hydrogenated graphene, nitrogenated graphene, chemically functionalized graphene, doped graphene (e.g. doped by B or N). Pristine graphene has essentially 0% oxygen. RGO typically has an oxygen content of 0.001%-5% by weight. Graphene oxide (including RGO) can have 0.001%-50% by weight of oxygen. Other than pristine graphene, all the graphene materials have 0.001%-50% by weight of non-carbon elements (e.g. O, H, N, B, F, Cl, Br, I, etc.). These materials are herein referred to as non-pristine graphene materials. The presently invented graphene can contain pristine or non-pristine graphene and the invented method allows for this flexibility. These graphene sheets all can be chemically functionalized.

Graphene sheets have a significant proportion of edges that correspond to the edge planes of graphite crystals. The carbon atoms at the edge planes are reactive and must contain some heteroatom or group to satisfy carbon valency. Further, there are many types of functional groups (e.g. hydroxyl and carboxylic) that are naturally present at the edge or surface of graphene sheets produced through chemical or electrochemical methods. Many chemical function groups (e.g. —$NH_2$, etc.) can be readily imparted to graphene edges and/or surfaces using methods that are well-known in the art.

The functionalized NGPs of the instant disclosure can be directly prepared by sulfonation, electrophilic addition to deoxygenated graphene platelet surfaces, or metallization. The graphene platelets can be processed prior to being contacted with a functionalizing agent. Such processing may include dispersing the graphene platelets in a solvent. In some instances, the platelets or may then be filtered and dried prior to contact. One particularly useful type of functional group is the carboxylic acid moieties, which naturally exist on the surfaces of NGPs if they are prepared from the acid intercalation route discussed earlier. If carboxylic acid functionalization is needed, the NGPs may be subjected to chlorate, nitric acid, or ammonium persulfate oxidation.

Carboxylic acid functionalized graphene sheets or platelets are particularly useful because they can serve as the starting point for preparing other types of functionalized NGPs. For example, alcohols or amides can be easily linked to the acid to give stable esters or amides. If the alcohol or amine is part of a di- or poly-functional molecule, then linkage through the O— or NH— leaves the other functionalities as pendant groups. These reactions can be carried out using any of the methods developed for esterifying or aminating carboxylic acids with alcohols or amines as known in the art. Examples of these methods can be found in G. W. Anderson, et al., J. Amer. Chem. Soc. 86, 1839 (1964), which is hereby incorporated by reference in its entirety. Amino groups can be introduced directly onto graphitic platelets by treating the platelets with nitric acid and sulfuric acid to obtain nitrated platelets, then chemically reducing the nitrated form with a reducing agent, such as sodium dithionite, to obtain amino-functionalized platelets.

A very significant and unexpected advantage of bringing graphene oxide sheets in direct contact with the primary surfaces of a Cu, Ni, or Ti foil is the notion that graphene oxide molecules can be well-bonded to these metal foils under the presently invented processing conditions, without using an external resin binder or adhesive (hence, no dramatically increased contact resistance). These processing conditions include well-aligning graphene oxide sheets on the metal foil surface and then heat-treating the two-layer structure at a temperature in the range from 80° C.-1,500° C. (more typically and desirably of 80° C.-500° C., and most typically and desirably of 80° C.-200° C.). Optionally, but not preferably, the heat treatment temperature can be as high as 3,000° C.

These processing conditions, in the cases of aluminum foil-based current collectors, include chemically etching off the passivating aluminum oxide layer prior to being coated with and bonded by graphene oxide, followed by a heat treatment under comparable temperature conditions described above. Alternatively, the graphene oxide may be prepared in a GO gel state, which is characterized by having high oxygen contents, reflecting high amounts of —OH and —COOH groups and having a pH value less than 5.0 (preferably <3.0 and even more preferably <2.0). The Al foil may be allowed to get immersed in a bath of GO gel, wherein the acidic environment naturally removes the passivating $Al_2O_3$ layer. When the Al foil emerges from the bath, GO molecules or sheets naturally adhere to the clean, etched Al foil surfaces, effectively preventing the exposure of Al foil surfaces to open air (hence, no passivating $Al_2O_3$ layer and no added contact resistance between an Al foil surface and the GO layer).

In addition to the chemical bonding power of the presently invented GO layer and the chemical etching power of the GO gel, the resulting thin film of graphene oxide in the presently invented graphene oxide-bonded metal foil has a thickness from 10 nm to 10 µm, an oxygen content from 0.1% to 10% by weight, an inter-graphene plane spacing of 0.335 to 0.50 nm, a physical density from 1.3 to 2.2 g/cm$^3$, all graphene oxide sheets being oriented substantially parallel to each other and parallel to the primary surfaces, exhibiting a thermal conductivity greater than 500 W/mK, and/or electrical conductivity greater than 1,500 S/cm when measured alone without the thin metal foil. This thin film of graphene oxide is chemically inert and provides a highly effective protective layer against corrosion of the underlying metal foil.

Figure 7:
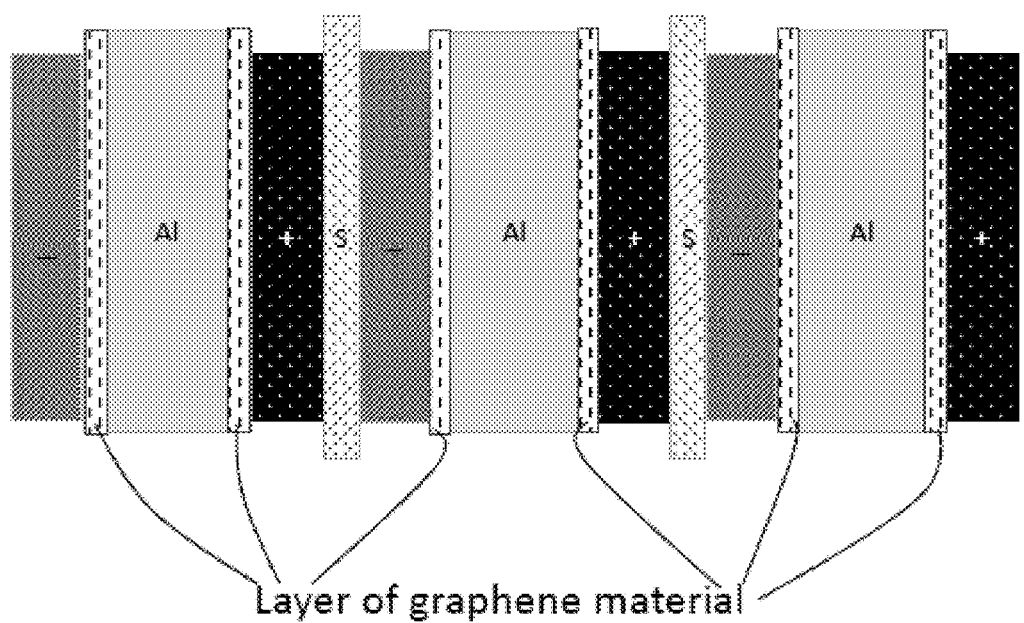
FIG. 7 Example of multiple bi-polar electrode-based battery unit cells connected in series; layers of graphene material are present between a current collector foil and an electrode layer (anode or cathode) according to certain embodiments of present disclosure.

The present disclosure also provides a rechargeable battery or capacitor that contains a plurality of the presently invented bipolar electrodes (e.g. an example is illustrated in FIG. 7). This can be any rechargeable battery, such as a zinc-air battery, a nickel metal hydride battery, a sodium-ion battery, a sodium metal battery, a magnesium-ion battery, or a magnesium metal battery, just to name a few. This invented battery can be a rechargeable lithium battery, selected from a lithium-sulfur battery, a lithium-selenium battery, a lithium sulfur/selenium battery, a lithium-ion battery, a lithium-air battery, a lithium-graphene battery, or a lithium-carbon battery. Another embodiment of the disclosure is a capacitor containing multiple bi-polar electrodes of the present disclosure, which capacitor is a symmetric ultracapacitor, an asymmetric ultracapacitor, a hybrid supercapacitor-battery device, or a lithium-ion capacitor.

As an example, the present disclosure provides a rechargeable lithium-metal battery comprising at least two bi-polar electrodes, wherein each bi-polar electrode comprises an Al current collector is coated with a lithium film or foil as the anode on one primary surface of this Al foil and coated with a cathode active material layer (e.g. lithium-free $V_2O_5$ and $MnO_2$) on the opposing primary surface of the same Al foil. The two bi-polar plates are electronically insulated by a porous separator/electrolyte layer, wherein the anode layer of one bi-polar electrode faces the cathode layer of the other bi-polar electrode, as illustrated in FIG. 7.

There is no restriction on the type of the anode active materials that can be used in the bipolar electrodes or bipolar batteries. For bi-polar lithium-ion batteries, the anode active material in the anode layer may be selected from the group consisting of: (a) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium titanium niobium oxide, lithium manganate, lithium aluminate, lithium-containing titanium oxide, lithium transition metal oxide; (f) prelithiated versions thereof; (g) particles of Li, Li alloy, or surface-stabilized Li having at least 60% by weight of lithium element therein; (h) particles, fibers, nano-tubes of carbon and graphite; and (i) combinations thereof. The Li alloy may contain from 0.1% to 10% by weight of a metal element selected from Zn, Ag, Au, Mg, Ni, Ti, Fe, Co, V, Al, or a combination thereof.

The anode active material may contain a prelithiated Si, prelithiated Ge, prelithiated Sn, prelithiated $SnO_x$, prelithiated $SiO_x$, prelithiated iron oxide, prelithiated $Mn_3O_4$, prelithiated $Co_3O_4$, prelithiated $Ni_3O_4$, lithium titanate, lithium niobite, or a combination thereof, wherein x=1 to 2.

The primary particles of anode active material may be in a form of nano particle, nano wire, nano fiber, nano tube, nano sheet, nano belt, nano ribbon, nano disc, nano platelet, or nano horn having a thickness or diameter from 0.5 nm to 100 nm. In some embodiments, at least one of the primary anode active material particles is coated with a layer of carbon, graphite, or graphene.

There is no restriction on the type of the cathode active material that can be used in the bipolar electrodes or bipolar batteries. For, the bi-polar lithium batteries, for instance, the cathode active material particulate may contain a cathode active material selected from an inorganic material, an organic material, a polymeric material, or a combination thereof. The inorganic material may be selected from a metal oxide, metal phosphate, metal silicide, metal selenide, transition metal sulfide, sulfur, lithium polysulfide, selenium, lithium selenide, or a combination thereof.

The inorganic material may be selected from a lithium cobalt oxide, lithium nickel oxide, lithium manganese oxide, lithium vanadium oxide, lithium-mixed metal oxide (such as the well-known NMC, NCA, etc., where N=I, M=Mn, C≡Co, and A=Al in these two examples), lithium iron phosphate, lithium manganese phosphate, lithium vanadium phosphate, lithium mixed metal phosphate, lithium metal silicide, or a combination thereof.

In certain preferred embodiments, the inorganic material-based cathode active material is selected from a metal fluoride or metal chloride including the group consisting of $CoF_3$, $MnF_3$, $FeF_3$, $VF_3$, $VOF_3$, $TiF_3$, $BiF_3$, $NiF_2$, $FeF_2$, $CuF_2$, $CuF$, $SnF_2$, $AgF$, $CuCl_2$, $FeCl_3$, $MnCl_2$, and combinations thereof. In certain preferred embodiments, the inorganic material is selected from a lithium transition metal silicate, denoted as $Li_2MSiO_4$ or $Li_2Ma_xMb_ySiO_4$, wherein M and Ma are selected from Fe, Mn, Co, Ni, V, or VO; Mb is selected from Fe, Mn, Co, Ni, V, Ti, Al, B, Sn, or Bi; and x+y≤1.

In certain preferred embodiments, the inorganic material is selected from a transition metal dichalcogenide, a transition metal trichalcogenide, or a combination thereof. The inorganic material is selected from $TiS_2$, $TaS_2$, $MoS_2$, $NbSe_3$, $MnO_2$, $CoO_2$, an iron oxide, a vanadium oxide, or a combination thereof.

The cathode active material layer may contain a metal oxide containing vanadium oxide selected from the group consisting of $VO_2$, $Li_xVO_2$, $V_2O_5$, $Li_xV_2O_5$, $V_3O_8$, $Li_xV_3O_8$, $Li_xV_3O_7$, $V_4O_9$, $Li_xV_4O_9$, $V_6O_{13}$, $Li_xV_6O_{13}$, their doped versions, their derivatives, and combinations thereof, wherein 0.1<x<5.

The cathode active material layer may contain a metal oxide or metal phosphate, selected from a layered compound $LiMO_2$, spinel compound $LiM_2O_4$, olivine compound $LiMPO_4$, silicate compound $Li_2MSiO_4$, Tavorite compound $LiMPO_4F$, borate compound $LiMBO_3$, or a combination thereof, wherein M is a transition metal or a mixture of multiple transition metals.

In some embodiments, the inorganic material is selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) a combination thereof.

The cathode active material layer may contain an organic material or polymeric material selected from Poly(anthraquinonyl sulfide) (PAQS), a lithium oxocarbon, 3,4,9,10-perylenetetracarboxylic dianhydride (PTCDA), poly(anthraquinonyl sulfide), pyrene-4,5,9,10-tetraone (PYT), polymer-bound PYT, Quino(triazene), redox-active organic material, Tetracyanoquinodimethane (TCNQ), tetracyanoethylene (TCNE), 2,3,6,7,10,11-hexamethoxytriphenylene (HMTP), poly(5-amino-1,4-dyhydroxy anthraquinone) (PADAQ), phosphazene disulfide polymer ($[(NPS_2)_3]n$), lithiated 1,4,5,8-naphthalenetetraol formaldehyde polymer, Hexaazatrinaphthylene (HATN), Hexaazatriphenylene hexacarbonitrile ($HAT(CN)_6$), 5-Benzylidene hydantoin, Isatine lithium salt, Pyromellitic diimide lithium salt, tetrahydroxy-p-benzoquinone derivatives ($THQLi_4$), N,N'-diphenyl-2,3,5,6-tetraketopiperazine (PHP), N,N'-diallyl-2,3,5,6-tetraketopiperazine (AP), N,N'-dipropyl-2,3,5,6-tetraketopiperazine (PRP), a thioether polymer, a quinone compound, 1,4-benzoquinone, 5,7,12,14-pentacenetetrone (PT), 5-amino-2,3-dihydro-1,4-dyhydroxy anthraquinone (ADDAQ), 5-amino-1,4-dyhydroxy anthraquinone (ADAQ), calixquinone, $Li_4C_6O_6$, $Li_2C_6O_6$, $Li_6C_6O_6$, or a combination thereof.

The thioether polymer is selected from Poly[methanetetryl-tetra(thiomethylene)] (PMTTM), Poly(2,4-dithiopentanylene) (PDTP), a polymer containing Poly(ethene-1,1,2,2-tetrathiol) (PETT) as a main-chain thioether polymers, a side-chain thioether polymer having a main-chain consisting of conjugating aromatic moieties, and having a thioether side chain as a pendant, Poly(2-phenyl-1,3-dithiolane) (PPDT), Poly(1,4-di(1,3-dithiolan-2-yl)benzene) (PDDTB), poly(tetrahydrobenzodithiophene) (PTHBDT), poly[1,2,4,5-tetrakis(propylthio)benzene] (PTKPTB, or poly[3,4(ethylenedithio)thiophene] (PEDTT).

In other embodiments, the cathode active material layer contains an organic material selected from a phthalocyanine compound, such as copper phthalocyanine, zinc phthalocyanine, tin phthalocyanine, iron phthalocyanine, lead phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, cobalt phthalocyanine, silver phthalocyanine, a metal-free phthalocyanine, a chemical derivative thereof, or a combination thereof.

The cathode active material is preferably in a form of nano particle (spherical, ellipsoidal, and irregular shape), nano wire, nano fiber, nano tube, nano sheet, nano belt, nano ribbon, nano disc, nano platelet, or nano horn having a thickness or diameter less than 100 nm. These shapes can be collectively referred to as "particles" unless otherwise specified or unless a specific type among the above species is desired. Further preferably, the cathode active material has a dimension less than 50 nm, even more preferably less than 20 nm, and most preferably less than 10 nm.

The electrolyte for a lithium secondary battery may be an organic electrolyte, ionic liquid electrolyte, gel polymer electrolyte, quasi-solid electrolyte (e.g. containing 2M-14 M of a lithium salt in a solvent), polymer electrolyte, inorganic electrolyte, composite electrolyte, or a combination thereof. The electrolyte typically contains an alkali metal salt (lithium salt, sodium salt, and/or potassium salt) dissolved in a solvent.

The solvent may be selected from 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofluoroether, a room temperature ionic liquid solvent, or a combination thereof.

The electrolytic salts to be incorporated into a non-aqueous electrolyte may be selected from a lithium salt such as lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoro-ethylsulfonylimide (LiBETI), an ionic liquid salt, sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-methanesulfonate ($NaCF_3SO_3$), potassium trifluoro-methanesulfonate ($KCF_3SO_3$), bis-trifluoromethyl sulfonylimide sodium ($NaN(CF_3SO_2)_2$), sodium trifluoromethanesulfonimide (NaTFSI), and bis-trifluoromethyl sulfonylimide potassium ($KN(CF_3SO_2)_2$). Among them, $LiPF_6$, $LiBF_4$ and $LiN(CF_3SO_2)_2$ are preferred for Li—S cells, $NaPF_6$ and $LiBF_4$ for Na—S cells, and $KBF_4$ for K—S cells. The content of aforementioned electrolytic salts in the non-aqueous solvent is preferably from 2.0 to 14 M (mol/L) to make a quasi-solid electrolyte.

The ionic liquid is composed of ions only. Ionic liquids are low melting temperature salts that are in a molten or liquid state when above a desired temperature. For instance, a salt is considered as an ionic liquid if its melting point is below 100° C. If the melting temperature is equal to or lower than room temperature (25° C.), the salt is referred to as a room temperature ionic liquid (RTIL). The IL salts are characterized by weak interactions, due to the combination of a large cation and a charge-delocalized anion. This results in a low tendency to crystallize due to flexibility (anion) and asymmetry (cation).

A typical and well-known ionic liquid is formed by the combination of a 1-ethyl-3-methylimidazolium (EMI) cation and an N,N-bis(trifluoromethane)sulphonamide (TFSI) anion. This combination gives a fluid with an ionic conductivity comparable to many organic electrolyte solutions and a low decomposition propensity and low vapor pressure up to –300-400° C. This implies a generally low volatility and non-flammability and, hence, a much safer electrolyte for batteries.

Ionic liquids are basically composed of organic ions that come in an essentially unlimited number of structural variations owing to the preparation ease of a large variety of their components. Thus, various kinds of salts can be used to design the ionic liquid that has the desired properties for a given application. These include, among others, imidazolium, pyrrolidinium and quaternary ammonium salts as cations and bis(trifluoromethanesulphonyl) imide, bis(fluorosulphonyl)imide, and hexafluorophosphate as anions. Based on their compositions, ionic liquids come in different classes that basically include aprotic, protic and zwitterionic types, each one suitable for a specific application.

Common cations of room temperature ionic liquids (RTILs) include, but not limited to, tetraalkylammonium, di-, tri-, and tetra-alkylimidazolium, alkylpyridinium, dialkyl-pyrrolidinium, dialkylpiperidinium, tetraalkylphosphonium, and trialkylsulfonium. Common anions of RTILs include, but not limited to, $BF_4^-$, $B(CN)_4^-$, $CH_3BF_3^-$, $CH2CHBF_3^-$, $CF_3BF_3^-$, $C_2F_5BF_3^-$, $n-C_3F_7BF_3^-$, $n-C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$, $F(HF)_{2.3}^-$, etc. Relatively speaking, the combination of imidazolium- or sulfonium-based cations and complex halide anions such as $AlCl_4^-$, $BF_4^-$, $CF_3CO_2^-$, $CF_3SO_3^-$, $NTf_2^-$, $N(SO_2F)_2^-$, or $F(HF)_{2.3}^-$ results in RTILs with good working conductivities.

Another example of the present disclosure is a lithium-ion capacitor (or hybrid supercapacitor) comprising multiple bi-polar electrodes. In each bi-polar electrode, there is a current collector having two opposing primary surfaces, wherein one primary surface is coated with a layer of graphite or lithium titanate (anode) and the opposing primary surface is coated with a cathode containing a cathode active material (e.g. activated carbon having a high specific surface area). Two bi-polar electrodes are separated by a porous separator soaked with gel or polymer electrolyte. Again, the anode layer of one bi-polar electrode faces the cathode layer of the other bi-polar electrode.

The present disclosure also provides a process for producing a bi-polar electrode for a battery or capacitor, the process comprising: (a) providing a conductive material foil having a thickness from 10 nm to 100 μm and two opposing parallel primary surfaces and coating one or both of the primary surfaces with a layer of graphene material having a thickness from 5 nm to 50 μm to form a graphene-coated current collector; and (b) depositing a negative electrode layer and a positive electrode layer onto two opposing primary surfaces, respectively, of the graphene-coated current collector, wherein the negative electrode layer is in physical contact with the layer of graphene material or directly with a primary surface of the conductive material foil and the positive electrode layer is in physical contact with the layer of graphene material or directly with the opposing primary surface of the conductive material foil.

The procedure of coating one or both of the primary surfaces with a layer of graphene material may comprise forming a layer of an aggregate of multiple oriented/aligned graphene sheets that are substantially parallel to one another.

The process coating procedure may comprise dispersing multiple graphene sheets in a matrix material or bonding the multiple graphene sheets by a binder material to form the layer of graphene material, and/or chemically bonding the layer of graphene material to the conductive material foil.

The multiple graphene sheets may contain single-layer or few-layer graphene sheets selected from a pristine graphene material having essentially zero % of non-carbon elements, or a non-pristine graphene material having 0.001% to 25% by weight of non-carbon elements wherein said non-pristine graphene is selected from graphene oxide, reduced graphene oxide, graphene fluoride, graphene chloride, graphene bromide, graphene iodide, hydrogenated graphene, nitrogenated graphene, doped graphene, chemically functionalized graphene, or a combination thereof.

In some embodiments, the procedure of forming a layer of an aggregate of multiple oriented/aligned graphene sheets comprises a procedure selected from air-assisted or liquid-assisted spraying of the multiple graphene sheets.

Preferably, the procedure of forming a layer of an aggregate of multiple oriented/aligned graphene sheets comprises forming a graphene dispersion containing multiple graphene sheets, followed by a procedure selected from coating, casting, spraying, printing, forced assembling and orienting procedure, or a combination thereof.

The coating procedure may be selected from vapor deposition, chemical coating, electrochemical coating or plating, spray-coating, painting, brushing, printing, roll-to-roll coating, physical coating, or a combination thereof.

The roll-to-roll coating may be selected from air knife coating, Anilox coating, Flexo coating, gap coating or knife-over-roll coating, gravure coating, hot melt coating, immersion dip coating, kiss coating, metering rod or Meyer bar coating, roller coating, silk screen coating or rotary screen coating, slot-die coating, extrusion coating, screen printing, or a combination thereof. Although the procedures of coating are well-known in the art, there has been no prior disclosure or suggestion about coating anode and cathode layers respectively on opposing surfaces of graphene-coated current collectors for the purpose of constructing bi-polar electrodes and bi-polar batteries and capacitors.

The process may further comprise a step of compressing the layer of graphene material to an extent that the multiple graphene sheets are substantially aligned to be parallel to one another.

In certain embodiments, step (a) of the process comprises catalyst-assisted chemical vapor deposition (CVD). This can be accomplished by introducing a carbon source vapor (e.g. hydrocarbon gas such as acetylene, methane, and naphthalene) onto the surfaces of a catalytic transition metal foil (e.g. Cu, Ni, Fe, etc.) at a sufficiently high CVD temperature (typically from 400° C. to 1,500° C. and more typically from 600° C. to 1,200° C.). For less catalytic or non-catalytic metal foils (e.g. Zn and Al), one may deposit a thin layer (1 nm to 5 µm) of a catalytic transition metal (e.g. Cu, Ni, Fe, Ti, Mn, Co, etc.) onto the surfaces of the foil prior to introducing the carbon source vapor.

In some embodiments, step (a) of the disclosed process comprises (i) dispersing multiple graphene sheets in a liquid medium to form a suspension (optionally containing an adhesive resin dispersed or dissolved therein), (ii) dispensing and depositing the suspension onto a surface of a substrate to form a wet aggregate of graphene sheets, and (iii) partially or completely removing the liquid medium from the wet aggregate to form the aggregate of multiple graphene sheets.

Preferably, the suspension comprises an adhesive resin dispersed or dissolved therein. The procedure may comprise a step of curing the adhesive resin or simply solidifying the adhesive resin by removing the liquid solvent used to dissolve the resin.

The process may further comprise a procedure of compressing or consolidating the aggregate to align the multiple graphene sheets and/or to reduce porosity in the aggregate.

Step (a) may comprise spraying multiple graphene sheets, with or without a dispersing liquid medium and with or without an adhesive resin, onto a solid substrate surface to form an aggregate of multiple graphene sheets. The process may further comprise a procedure of compressing or consolidating the aggregate to align multiple graphene sheets and/or to reduce porosity in said aggregate or cluster.

In some embodiments, the process further comprises a procedure for heat-treating the aggregate layer of multiple graphene sheets, after procedure (a), at a temperature or multiple different temperatures selected from 50° C. to 3,200° C. The maximum temperature cannot be higher than the melting point or degradation temperature of the conductive material foil. The process may further comprise a procedure, after heat-treating, for compressing or consolidating the aggregate of multiple graphene sheets.

The process may further comprise implementing multiple bi-polar electrodes as herein defined to form a bi-polar battery or bi-polar capacitor.

Example 1: Preparation of Discrete Graphene Sheets (NGPs) and Expanded Graphite Flakes for Use in Bi-Polar Electrodes Chopped graphite fibers with an average diameter of 12 µm and natural graphite particles were separately used as a starting material, which was immersed in a mixture of concentrated sulfuric acid, nitric acid, and potassium permanganate (as the chemical intercalate and oxidizer) to prepare graphite intercalation compounds (GICs). The starting material was first dried in a vacuum oven for 24 h at 80° C. Then, a mixture of concentrated sulfuric acid, fuming nitric acid, and potassium permanganate (at a weight ratio of 4:1:0.05) was slowly added, under appropriate cooling and stirring, to a three-neck flask containing fiber segments. After 16 hours of reaction, the acid-treated graphite fibers or natural graphite particles were filtered and washed thoroughly with deionized water until the pH level of the solution reached 6. After being dried at 100° C. overnight, the resulting graphite intercalation compound (GIC) was subjected to a thermal shock at 1050° C. for 45 seconds in a tube furnace to form exfoliated graphite (or graphite worms).

Five grams of the resulting exfoliated graphite (graphite worms) were mixed with 2,000 ml alcohol solution consisting of alcohol and distilled water with a ratio of 65:35 for 12 hours to obtain a suspension. Then the mixture or suspension was subjected to ultrasonic irradiation with a power of 200 W for various times. After two hours of sonication, EG particles were effectively fragmented into thin NGPs. The suspension was then filtered and dried at 80° C. to remove residue solvents. The as-prepared NGPs have an average thickness of approximately 9.7 nm.

Another five grams of the resulting exfoliated graphite (EG) were subjected to low-intensity air jet milling to break up graphite worms, forming expanded graphite flakes (having an average thickness of 139 nm). Both samples of expanded graphite flakes and graphene sheets were mixed with a binder resin (PVDF) and then coated onto primary surfaces of Cu foil and Al foil to form expanded graphite-coated current collectors and graphene oxide-coated current collectors. Additionally, a sheet of Al foil was cleaned with acetone and then spray-coated with GO or RGO sheets on one or both primary surfaces. Each of the resulting graphene-coated and expanded graphite-coated current collectors was then coated with an anode layer on one primary surface and a cathode layer on the opposing primary surface to form a bi-polar electrode. Bi-polar electrodes were then used to make bi-polar lithium batteries and supercapacitors.

Example 2: Preparation of Graphene from Meso-Carbon Micro-Beads (MCMBs) for Bi-Polar Electrodes Meso-carbon microbeads (MCMBs) were supplied from China Steel Chemical Co. This material has a density of about 2.24 g/cm$^3$ with a median particle size of about 16 μm. MCMB (10 grams) were intercalated with an acid solution (sulfuric acid, nitric acid, and potassium permanganate at a ratio of 4:1:0.05) for 72 hours. Upon completion of the reaction, the mixture was poured into deionized water and filtered. The intercalated MCMBs were repeatedly washed in a 5% solution of HCl to remove most of the sulfate ions. The sample was then washed repeatedly with deionized water until the pH of the filtrate was neutral. The slurry was dried and stored in a vacuum oven at 60° C. for 24 hours. The dried powder sample was placed in a quartz tube and inserted into a horizontal tube furnace pre-set at a desired temperature, 1,080° C. for 45 seconds to obtain a graphene material. TEM and atomic force microscopic studies indicate that most of the NGPs were single-layer graphene. These graphene sheets are made into free-standing graphene paper or deposited (along with a resin binder) onto one or both primary surfaces of a thin metal foil or conducting polymer film (e.g. polyaniline and polypyrrole). In the case of Al foil, samples of graphene-coated Al foil (no binder) were also prepared. The resulting graphene-protected current collectors were then made into bi-polar electrodes by coating the two primary surfaces of a coated current collector with an anode layer and a cathode layer, respectively.

Example 3: Preparation of Pristine Graphene Sheets/Platelets for Bi-Polar Electrodes In a typical procedure, five grams of graphite flakes, ground to approximately 20 μm or less in sizes, were dispersed in 1,000 mL of deionized water (containing 0.1% by weight of a dispersing agent, Zonyl® FSO from DuPont) to obtain a suspension. An ultrasonic energy level of 85 W (Branson 5450 Ultrasonicator) was used for exfoliation, separation, and size reduction of graphene sheets for a period of 15 minutes to 2 hours.

Multiple graphene sheets were dispersed in a UV-curable adhesive resin to form a suspension, which was spray-coated onto both primary surfaces of conductive material foils. The resulting graphene-protected current collectors were then made into bi-polar electrodes by coating the two primary surfaces of a coated current collector with an anode layer and a cathode layer, respectively.

Example 4: Preparation of Graphene Oxide (GO) Gel and GO Gel-Coated Current Collectors for Bi-Polar Electrodes Graphene oxide gel was prepared by oxidation of graphite flakes with an oxidizer liquid consisting of sulfuric acid, sodium nitrate, and potassium permanganate at a ratio of 4:1:0.05 at 30° C. When natural graphite flakes (particle sizes of 14 μm) were immersed and dispersed in the oxidizer mixture liquid, the suspension or slurry appears optically opaque and dark. The suspension remains opaque during the first 52 hours of reaction. However, the suspension gradually turns optically translucent (a little cloudy) when the reaction time exceeds 52 hours, and the color of the suspension changes from black to dark brown. After 96 hours, the suspension suddenly becomes an optically transparent solution with light brown color. The solution appears very uniform in color and transparency, indicating the absence of any dispersed discrete objects. The whole solution behaves like a gel, very similar to a typical polymer gel.

Surprisingly, by casting this gel on a metal foil surface (Cu, Al, Ni, Ti, or stainless steel) and removing the liquid medium from the cast film we obtain a thin film of graphene oxide that is optically transparent. This thin film looks like, feels like, and behaves like a regular polymer film. However, upon heat treatments at a temperature (from 80° C. to 1,500° C.) for typically 1-3 hours, this GO film is transformed into a monolithic thin film entity comprising large-size graphene domains. This GO film is well bonded to the underlying metal foil.

Figure 8A:
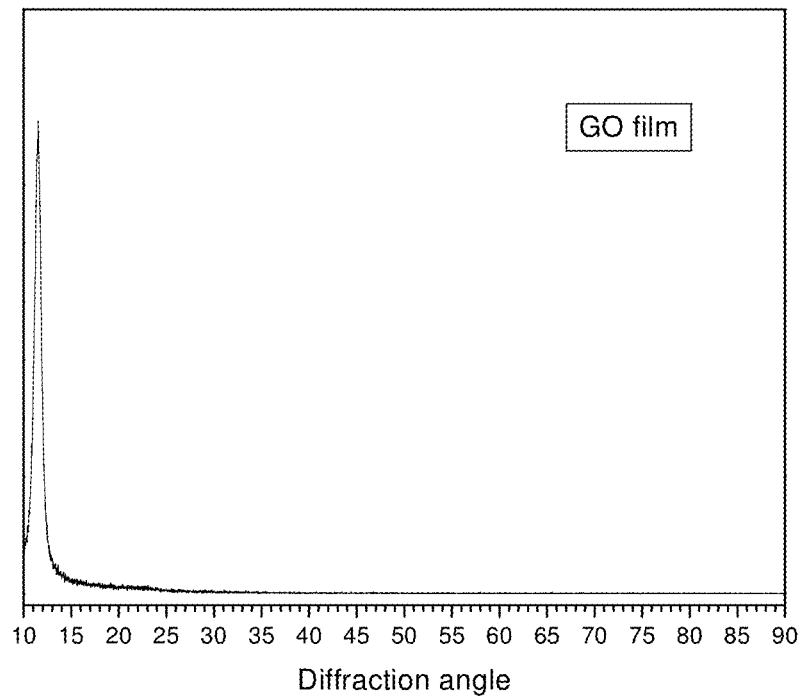
FIG. 8(A) X-ray diffraction curves of a GO film (dried GO gel)
Figure 8B:
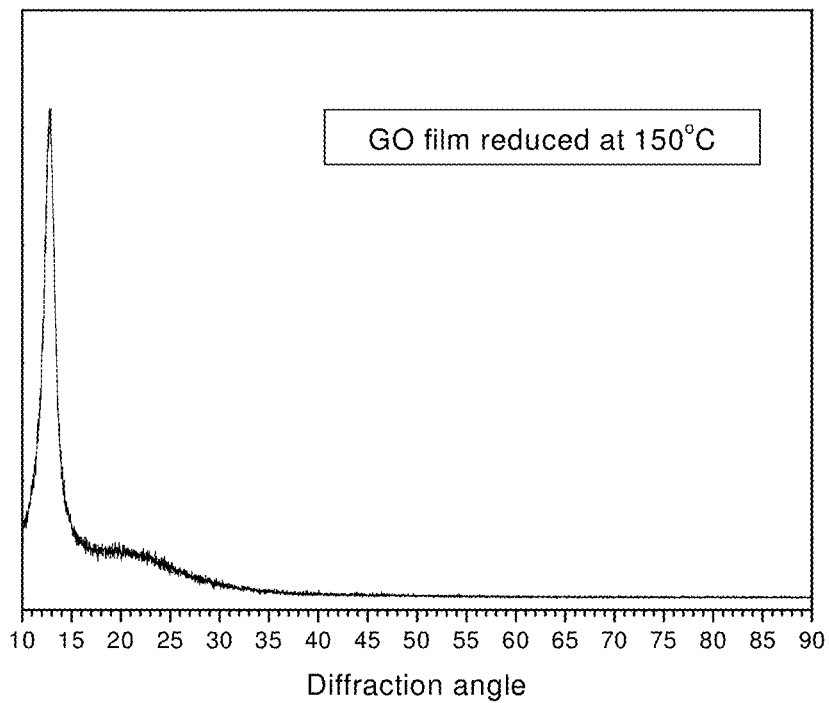
FIG. 8(B) X-ray diffraction curve of GO film thermally reduced at 150° C. (partially reduced), FIG. 8(C) X-ray diffraction curve of highly reduced and re-graphitized GO film, FIG. 8(D) X-ray diffraction curve of highly re-graphitized and re-crystallized GO crystal showing a high-intensity (004) peak, and FIG. 8(E) X-ray diffraction curve of a polyimide-derived HOPG with a HTT as high as 3,000° C.
Figure 8C:
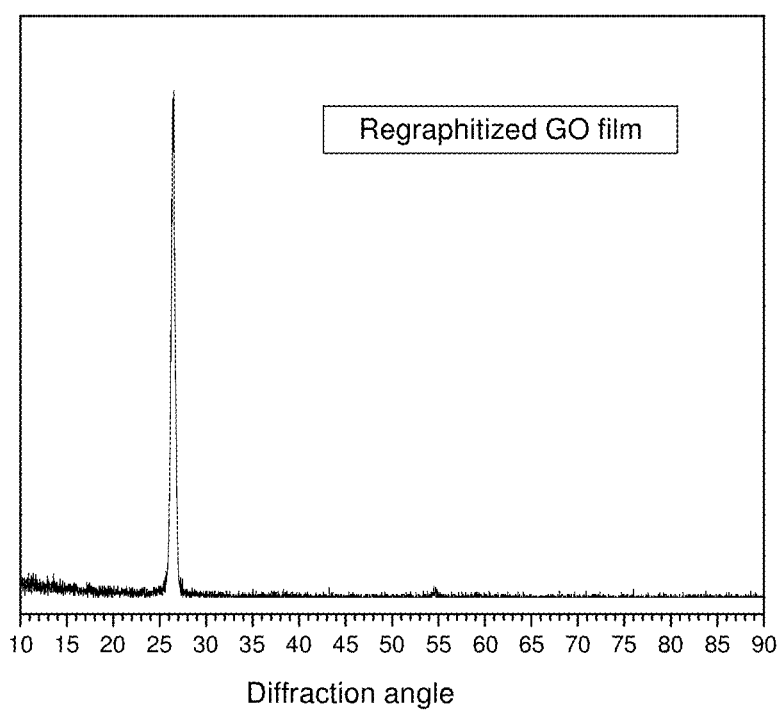

X-ray diffraction curves of a GO film (GO gel coated on a glass surface with liquid medium removed) prior to a heat treatment, a GO film thermally reduced at 150° C. for one hour, and a highly reduced and re-graphitized GO film (a unitary graphene layer) are shown in FIG. 8(A), FIG. 8(B), and FIG. 8(C), respectively. The peak at approximately 2θ=12° of the dried GO film (FIG. 8(A)) corresponds to an inter-graphene spacing ($d_{002}$) of approximately 0.7 nm. With some heat treatment at 150° C., the GO film exhibits the formation of a hump centered at 22° (FIG. 8(B)), indicating that it has begun the process of decreasing the inter-graphene spacing, indicating the beginning of chemical linking and ordering processes. With a heat treatment temperature of 1,250° C. for 3 hours, the $d_{002}$ spacing has decreased to approximately 0.34, close to 0.3354 nm of a graphite single crystal.

Figure 8D:
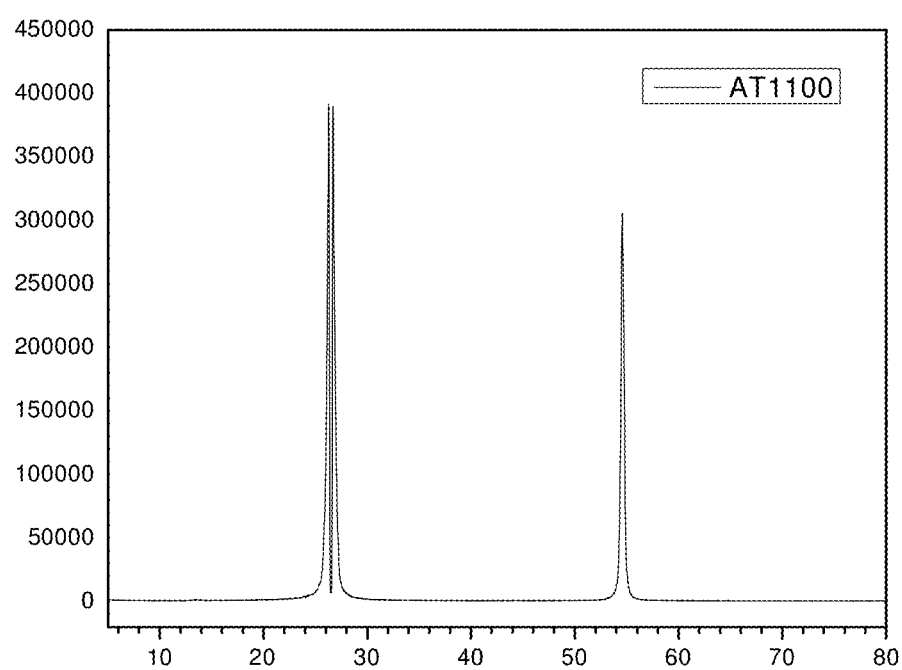
Figure 8E:
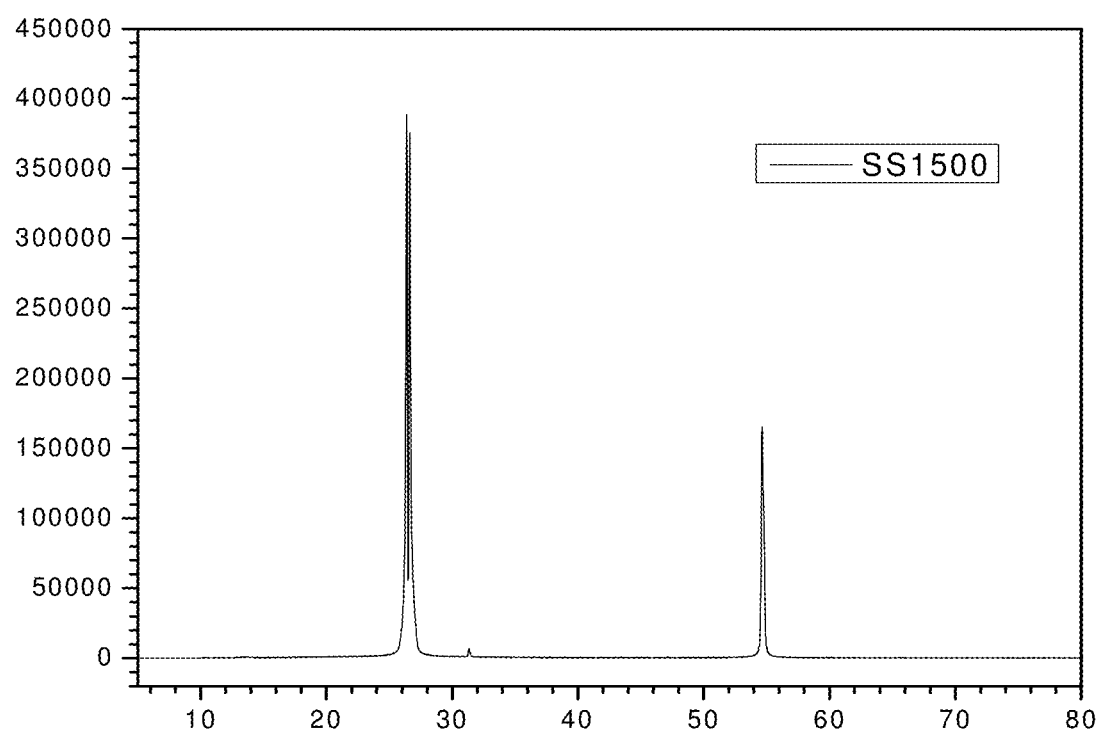

With a heat treatment temperature of 1,500° C. for 3 hours, the $d_{002}$ spacing is decreased to approximately to 0.3354 nm, identical to that of a graphite single crystal. In addition, a second diffraction peak with a high intensity appears at 2θ=55° corresponding to X-ray diffraction from (004) plane (FIG. 8(D)). The (004) peak intensity relative to the (002) intensity on the same diffraction curve, or the I(004)/I(002) ratio, is a good indication of the degree of crystal perfection and preferred orientation of graphene planes. The (004) peak is either non-existing or relatively weak, with the I(004)/I(002) ratio<0.1, for all graphitic materials heat treated at a temperature lower than 2,800° C. The I(004)/I(002) ratio for the graphitic materials heat treated at 3,000-3,250° C. (e.g, highly oriented pyrolytic graphite, HOPG) is in the range from 0.2-0.5. One example is presented in FIG. 8(E) for a polyimide-derived PG with a HTT of 3,000° C. for two hours, which exhibits a I(004)/I (002) ratio of about 0.41. In contrast, a thin film of GO bonded on a metal foil prepared with a HTT of 1,500° C. for 4 hours exhibits a I(004)/I(002) ratio of 0.78 and a Mosaic spread value of 0.21, indicating a practically perfect graphene single crystal with an exceptional degree of preferred orientation. There is a synergistic effect between the thin GO layer (<1 μm) prepared from GO gel and the underlying metal foil (Cu, Ni, Ti, and steel).

The "mosaic spread" value obtained from the full width at half maximum of the (002) reflection in an X-ray diffraction intensity curve. This index for the degree of ordering characterizes the graphite or graphene crystal size (or grain size), amounts of grain boundaries and other defects, and the degree of preferred grain orientation. A nearly perfect single crystal of graphite is characterized by having a mosaic spread value of 0.2-0.4. Most of our unitary graphene materials have a mosaic spread value in this range of 0.2-0.4 (with a heat treatment temperature no less than 1,500° C.).

It may be noted that the I(004)/I(002) ratio for all tens of flexible graphite samples investigated are all <<0.05, practically non-existing in most cases. The I(004)/I(002) ratio for all graphene paper/membrane samples is <0.1 even after a heat treatment at 3,000° C. for 2 hours. Attempts to graphitize the ultra-thin films (<2 nm in thickness) prepared by Cu-catalyzed CVD led to the breaking up of the film and the formation of graphite particles instead. These observations have further confirmed or affirmed the already established notion that the presently invented GO film-bonded metal foil is a new and distinct class of material that is fundamental different from any pyrolytic graphite (PG), flexible graphite (FG), and paper/film/membrane of conventional graphene/GO/RGO sheets/platelets (NGPs) that are free-standing or coated on a metal foil.

The inter-graphene spacing values of GO gel-derived GO films obtained by heat treating at various temperatures over a wide temperature range were measured. A heat treatment temperature as low as 500° C. appears to be sufficient to bring the average inter-graphene spacing in GO to below 0.4 nm, getting closer and closer to that of natural graphite or that of a graphite single crystal. The GO gel approach has enabled us to re-organize, re-orient, and chemically merge the planar graphene oxide molecules from originally different graphite particles or graphene sheets into a graphene monolith with all the graphene planes now being larger in lateral dimensions (significantly larger than the length and width of original graphene planes) and essentially parallel to one another. This has given rise to a thermal conductivity already >420 W/mK (with a HTT of 500° C.) and >950 W/mk with a HTT of 700° C.), which is more than 2- to 4-fold greater than the value (200 W/mK) of the corresponding flexible graphite foil. These planar GO molecules are derived from the graphene planes that constitute the original structure of starting natural graphite particles (used in the procedure of graphite oxidation to form the GO gel). The original natural graphite particles, when randomly packed into an aggregate or "graphite compact", would have their constituent graphene planes randomly oriented, exhibiting relatively low thermal conductivity and having essentially zero strength (no structural integrity). In contrast, the strength of the unitary graphene layer (even without an added reinforcement) is typically already in the range from 40-140 MPa.

With a HTT as low as 800° C., the resulting unitary graphene layer exhibits a thermal conductivity of 1,148 W/mK, in contrast to the observed 244 W/mK of the flexible graphite foil with an identical heat treatment temperature. As a matter of fact, no matter how high the HTT is (e.g. even as high as 2,800° C.), the flexible graphite foil only shows a thermal conductivity lower than 600 W/mK. At a HTT of 2,800° C., the presently invented unitary graphene layer delivers a thermal conductivity of 1,807 W/mK even though the metal foil has been melted at such a high temperature.

Scanning electron microscopy (SEM), transmission electron microscopy (TEM) pictures of lattice imaging of the graphene layer, as well as selected-area electron diffraction (SAD), bright field (BF), and dark-field (DF) images were also conducted to characterize the structure of unitary graphene materials. For measurement of cross-sectional views of the film, the sample was buried in a polymer matrix, sliced using an ultra-microtome, and etched with Ar plasma.

SEM studies have indicated that the graphene layers in a monolithic GO thin film are substantially oriented parallel to one another; but this is not the case for flexible graphite foils and graphene oxide paper. The inclination angles between two identifiable layers in the GO thin film entity are mostly less than 5 degrees. In contrast, there are so many folded graphite flakes, kinks, and mis-orientations in flexible graphite that many of the angles between two graphite flakes are greater than 15 degrees, some as high as 45 degrees.

Example 5: Preparation of Graphene Fluoride Sheets for Bi-Polar Electrodes

Several processes have been used by us to produce GF, but only one process is herein described as an example. In a typical procedure, highly exfoliated graphite (HEG) was prepared from intercalated compound $C_2F \cdot xClF_3$. HEG was further fluorinated by vapors of chlorine trifluoride to yield fluorinated highly exfoliated graphite (FHEG). A pre-cooled Teflon reactor was filled with 20-30 mL of liquid pre-cooled $ClF_3$, and then the reactor was closed and cooled to liquid nitrogen temperature. Subsequently, no more than 1 g of HEG was put in a container with holes for $ClF_3$ gas to access the reactor. After 7-10 days, a gray-beige product with approximate formula $C_2F$ was formed. GF sheets were then dispersed in halogenated solvents to form suspensions. The suspensions were then coated on PET film substrate surfaces using comma coating, dried, peeled off from the substrate, and heat treated at 500° C. for 3 hours and 2750° C. for 1 hour. After heat treatments, the films were sprayed with some rubber solution (e.g. ethylene oxide-epichlorohydrin copolymer dissolved in xylene), which was then dried to remove the solvent. The rubber-impregnated films were then roll-pressed with the rubber cured.

Example 6: Preparation of Nitrogenated Graphene Sheet-Based Bi-Polar Electrodes

Graphene oxide (GO), synthesized in Example 2, was finely ground with different proportions of urea and the pelletized mixture heated in a microwave reactor (900 W) for 30 s. The product was washed several times with deionized water and vacuum dried. In this method graphene oxide gets simultaneously reduced and doped with nitrogen. The products obtained with graphene/urea mass ratios of 1/0.5, 1/1 and 1/2 are designated as N-1, N-2 and N-3 respectively and the nitrogen contents of these samples were 14.7, 18.2 and 17.5 wt. % respectively as determined by elemental analysis. These nitrogenated graphene sheets remain dispersible in water. The resulting dispersion was slot-die coated on one or both primary surfaces of a roll of Al foil to produce graphene-coated Al current collectors for use in production of bi-polar electrodes.

Example 7: Functionalized Graphene-Coated Conductive Foils for Bi-Polar Electrodes Thermal films were prepared from several functionalized graphene-elastomer dispersions containing 5% by weight of functionalized graphene sheets (few-layer graphene) and 0.01% by weight of urethane oligomer (a mixture of di-isocyanate and polyol). Chemical functional groups involved in this study include an azide compound (2-Azidoethanol), alkyl silane, hydroxyl group, carboxyl group, amine group, sulfonate group ($-SO_3H$), and diethylenetriamine (DETA). These functionalized graphene sheets were supplied from Taiwan Graphene Co., Taipei, Taiwan. Upon casting of the dispersion onto two surfaces of Cu foil and stainless steel foil, removal of the liquid medium (acetone), compressed with a heated press and cured at 150° C. for 45 minutes, one obtained functionalized graphene-coated current collectors wherein graphene sheets were well bonded to urethane based adhesive.

Example 8: Li—S Cell Containing a Graphene Oxide-Bonded Metal Foil Current Collector to Support an Anode Layer and a Cathode Layer on the Two Primary Surfaces Several Li—S batteries were prepared and tested, each having 6 bi-polar electrodes connected in series, similar to the configuration as schematically illustrated in FIG. 7 but having 6 units instead of 3. Each bipolar electrode has a lithium foil as the anode active material layer coated on one surface of a graphene-coated metal foil and a layer of sulfur/expanded graphite composite (75/25 wt. ratio) as the cathode active material coated on the opposing surface of the same foil. The battery has 2.8M of $LiN(CF_3SO_2)_2$ and 0.5% polyethylene oxide (PEO) dissolved in DOL as the electrolyte, and a Celgard 2400 (a porous polymer) as the separator.

The first battery contains three 6 bi-polar electrodes, each containing a 8-μm thick Cu foil as the current collector which was coated with a GO layer (55 nm thick) on each primary surface. The GO-coated Cu foil was coated with an anode layer (Li foil) on one primary surface and a cathode layer on the opposing primary surface. The second battery was similar to the first battery in configuration, but the current collector used was a 14-μm RGO-coated Al foil. The third cell has a GO-bonded Al foil having one primary surface coated with RGO but the opposing surface being graphene-free (not coated with a graphene layer). Each bi-polar battery behaves like a single battery cell unit having an output voltage of 12 V. Such a single-cell module is compact and light weight, thus exhibiting exceptional energy density (energy/volume) and exceptional specific energy (energy/mass) values. For comparison purpose, a baseline Li—S battery is prepared, which comprises an equal number of anode layers and cathode layers being arranged in a configuration similar to that as schematically illustrated in FIG. 3. Multiple unit cells are connected in series through Cu wires and welded tabs, which are heavy and bulky.

Charge storage capacities were measured periodically and recorded as a function of the number of cycles. The specific discharge capacity herein referred to is the total charge inserted into the cathode during the discharge, per unit mass of the composite cathode (counting the weights of cathode active material, conductive additive or support, and the binder, but excluding the current collectors). The specific energy and specific power values presented in this section are based on the total cell weight (including anode and cathode, separator and electrolyte, current collectors, and packaging materials). The morphological or micro-structural changes of selected samples after a desired number of repeated charging and recharging cycles were observed using both transmission electron microscopy (TEM) and scanning electron microscopy (SEM). The battery featuring a current collector having both sides being protected by a layer of graphene material is most capable of maintaining higher energy density and capacity for a largest number of charge/discharge cycles.

Example 9: Bi-Polar Magnesium-Ion Batteries Containing Graphene-Protected Current Collectors For the preparation of a cathode active material (Magnesium Manganese Silicate, $Mg_{1.03}Mn_{0.97}SiO_4$), reagent-grade KCl (melting point=780° C.) was used as flux after drying for 3 h at 150° C. under vacuum. The starting materials were magnesium oxide (MgO), manganese (II) carbonate ($MnCO_3$) and silicon dioxide ($SiO_2$, 15-20 nm) powder. The stoichiometric amounts for the precursor compounds were controlled with the molar ratio of 1.03:0.97:1 for Mg:Mn:Si. The mixture (flux/reactants molar ratio=4) was hand-ground in a mortar by pestle for a 10 minutes, and then poured into a corundum crucible. Then, the powder mixture was dried at 120° C. for 5 h in a vacuum to minimize the water content in the mixture. Subsequently, the mixture was immediately transferred to a tube furnace and heated in a reductive atmosphere (Ar+5 wt % H2) at 350° C. for 2 h to remove carbonate groups. This was followed by final firing at various temperatures at a rate of 2° C./min for 6 h, then cooling to room temperature naturally. Finally, the product (Magnesium Manganese Silicate, $Mg_{1.03}Mn_{0.97}SiO_4$) was washed three times with deionized water to dissolve any remaining salt, separated by centrifugation, and dried under vacuum at 100° C. for 2 h.

The electrodes were typically prepared by mixing 85 wt % of an electrode active material (e.g. $Mg_{1.03}Mn_{0.97}SiO_4$ particles, 7 wt % acetylene black (Super-P), and 8 wt % polyvinylidene fluoride binder (PVDF, 5 wt % solid content dissolved in N-methyl-2-pyrrolidinoe (NMP)) to form a slurry-like mixture. After coating the slurry on a primary surface of an intended current collector (with or without graphene protection), the resulting electrode was dried at 120° C. in vacuum for 2 h to remove the solvent before pressing. The opposing surface of the current collector foil was coated with a thin sheet of magnesium foil. Three batteries having different current collectors or bi-polar electrodes were investigated.

First battery has three bi-polar electrodes connected in series, wherein each bi-polar electrode contains a GO-bonded Cu foil as the current collector (GO coated on both sides). One surface of the GO-protected Cu foil is coated with an anode layer (Mg foil) and the opposing surface coated with a cathode layer ($Mg_{1.03}Mn_{0.97}SiO_4$ particle-based). The second battery has a similar structure, but containing GO-bonded Al foil as the current collector, instead. The third battery has three conventional Mg-ion cells connected in series using wires, tabs, and welds, wherein each cell has a Cu foil as the anode current collector and Al foil as the cathode current collector (a prior art cell). The electrolyte used was 2.5 M of $Mg(AlCl_2EtBu)_2$ in THF.

Example 10: Chemical and Mechanical Compatibility Testing of Various Current Collectors for Various Intended Bi-Polar Batteries or Supercapacitors Long-term stability of a current collector relative to the electrolyte of a battery or supercapacitor is a major concern. In order to understand the chemical stability of various current collectors, a major task was undertaken to expose current collectors in several representative electrolytes. After an extended period of time (e.g. 30 days), the current collector was removed from the electrolyte solution and observed using optical and scanning electron microscopy (SEM). The results are summarized in Table 1 below, which consistently demonstrate that the inventive GO-bonded metal foil current collectors are highly compatible with all kinds of liquid electrolytes commonly used in batteries and supercapacitors. The inventive materials are resistant to any chemical attack. These GO-protected current collectors are essentially electrochemically inert over a voltage range of 0-5.5 volts Vs. $Li/Li^+$, suitable for use with just about any battery/capacitor electrolyte. It may be note that, for use in a bi-polar electrode, the negative electrode layer and the positive electrode layer coated on the two sides of a current collector are different in composition or structure.

TABLE 1

Results of current collector-electrolyte compatibility testing.

| Sample No. | Intended bipolar battery or capacitor | Current collector | Electrolyte | Observations |
|---|---|---|---|---|
| Li-1A | Li-ion or Li metal | GO film-bonded Cu foil | 2.5M $LiPF_6$ in PC + DME | Remains intact, no swelling, no micro-cracking; no pits. |
| Li-1B | Li-ion or Li metal | CVD graphene film | 2.5M $LiPF_6$ in PC + DME | Micro-cracks formed along grain boundaries |
| Li-1C | Li-ion or Li metal | RGO coated on polyanniline film | 2.5M $LiPF_6$ in PC + DME | RGO layer swollen, delamination from PET film |
| Na-1A | Na-ion or Na metal | GO film-bonded Ti foil | 2.5M $NaClO_4$ in DOL + DEC | Remains intact, no swelling, no micro-cracking |
| Na-1B | Na-ion or Na metal | CVD graphene film on Cu foil | 2.5M $NaClO_4$ in DOL + DEC | Micro-cracks formed along grain boundaries |
| Sup-1A | Supercapacitor or hybrid | GO film-bonded Al foil | 2.6M $H_2SO_4$ in water | Remains intact, no swelling, no micro-cracking |
| Sup-1B | Supercapacitor or hybrid | Conventional flexible graphite foil | 2.6M $H_2SO_4$ in water | Severely swollen, flaking (graphite flakes coming off) |
| Sup-1C | Supercapacitor or hybrid | GO film-bonded Al foil | Alkylammonium in acetonitrile | Remains intact, no swelling, no micro-cracking, no pitting corrosion |
| Sup-1D | Supercapacitor or hybrid | Carbon-coated Al | Alkylammonium in acetonitrile | Corrosion of Al layer; some carbon flaking |
| Zn-1A | Zinc-air | GO film-bonded Ni foil | KOH in water | Remains intact, no swelling, no micro-cracking |
| Zn-1B | Zinc-air | Conventional flexible graphite foil | KOH in water | Severely swollen, flaking |

The invention claimed is:

1. A bi-polar electrode for a battery or capacitor, wherein said bi-polar electrode comprises:
   a) A current collector comprising a conductive material foil having a thickness from 10 nm to 100 μm and two opposing parallel primary surfaces, wherein one or both of the primary surfaces is coated with a layer of graphene material having a thickness from 5 nm to 50 μm; and
   b) a negative electrode layer and a positive electrode layer respectively disposed on two sides of said current collector, each in physical contact with said layer of graphene material or directly with a primary surface of said conductive material foil, wherein the negative electrode layer and the positive electrode layer coated on the two sides of said current collector are different in composition or structure.

2. The bi-polar electrode of claim 1, wherein both of the primary surfaces are each coated with a layer of graphene material and said negative electrode layer is physically attached or chemically bonded to said one layer of graphene material and said positive electrode layer is physically attached or chemically bonded to said other layer of graphene material.

3. The bi-polar electrode of claim 1, wherein said graphene material contains graphene sheets selected from pristine graphene, oxidized graphene, reduced graphene oxide, fluorinated graphene, graphene bromide, graphene chloride, graphene iodide, hydrogenated graphene, nitrogenated graphene, doped graphene, chemically functionalized graphene, or a combination thereof.

4. The bi-polar electrode of claim 1, wherein said layer of graphene material comprises multiple graphene sheets dispersed in a matrix material or bonded by a binder material, and/or wherein said layer of graphene material is chemically bonded to said conductive material foil.

5. The bi-polar electrode of claim 1, wherein said graphene material contains graphene sheets that are aligned to be substantially parallel to one another having an average angle between graphene sheets less than 15 degrees.

6. The bi-polar electrode of claim 1, wherein said conductive material foil is selected from a metal, an electrically conductive polymer, or a combination thereof.

7. The bi-polar electrode of claim 6, wherein said metal is selected from Mg, Al, Sn, Sb, Ti, V, Cr, Mn, Fe, Co, Ni, Cu, Zn, Cd, Ag, Pd, Mo, Nb, Zr, Au, Pt, W, Ta, an alloy thereof, or a combination thereof.

8. The bi-polar electrode of claim 6, wherein said electrically conductive polymer comprises a conjugated polymer selected from polyacetylene, polythiophene, poly(3-alkylthiophenes), polypyrrole, polyaniline, poly(isothianaphthene), poly(3,4-ethylenedioxythiophene), alkoxy-substituted poly(p-phenylene vinylene), poly(2,5-bis(cholestanoxy) phenylene vinylene), poly(p-phenylene vinylene), poly(2,5-dialkoxy) paraphenylene vinylene, poly[(1,4-phenylene-1,2-diphenylvinylene)], poly(3',7'-dimethyloctyloxy phenylene vinylene), polyparaphenylene, polyparaphenylene, polyparaphenylene sulphide, polyheptadiyne, poly(3-hexylthiophene), poly(3-octylthiophene), poly(3-cyclohexylthiophene), poly(3-methyl-4-cyclohexylthiophene), poly(2,5-dialkoxy-1,4-phenyleneethynylene), poly(2-decyloxy-1,4-phenylene), poly(9,9-dioctylfluorene), polyquinoline, a derivative thereof, a copolymer thereof, a sulfonated version thereof, or a combination thereof.

9. The bi-polar electrode of claim 1, wherein said layer of graphene material comprises a thin film of graphene oxide sheets chemically bonded to at least one of said two opposed primary surfaces of said conductive material foil with or without using a binder or adhesive wherein said at least one primary surface does not contain a layer of passivating metal oxide and wherein said thin film of graphene oxide has a thickness from 10 nm to 10 μm, an oxygen content from 0.1% to 10% by weight, an inter-graphene plane spacing of 0.335 to 0.50 nm, a physical density from 1.3 to 2.2 g/cm$^3$, all graphene oxide sheets being oriented substantially parallel to each other and parallel to said primary surfaces, exhibiting a thermal conductivity greater than 500 W/mK, and/or electrical conductivity greater than 1,500 S/cm when measured alone without said thin conductive material foil.

10. The bi-polar electrode of claim 9, wherein each of said two opposed primary surfaces is chemically bonded with a thin film of graphene oxide sheets with or without using a binder or adhesive; wherein said thin film of graphene oxide has a thickness from 10 nm to 10 μm, an oxygen content from 0.1% to 10% by weight, an inter-graphene plane spacing of 0.335 to 0.50 nm, a physical density from 1.3 to 2.2 g/cm$^3$, all graphene oxide sheets are oriented substantially parallel to each other and parallel to said primary surfaces, exhibiting a thermal conductivity greater than 500 W/mK and electrical conductivity greater than 1,500 S/cm when measured alone without said thin metal foil.

11. The bi-polar electrode of claim 1, wherein said thin metal foil has a thickness from 4 to 10 μm.

12. The bi-polar electrode of claim 1, wherein said layer of graphene material has a thickness from 20 nm to 2 μm.

13. The bi-polar electrode of claim 1, wherein said metal foil is selected from Cu, Ti, Ni, stainless steel, and chemically etched Al foil, wherein a surface of said chemically etched Al foil has no passivating Al$_2$O$_3$ formed thereon prior to being bonded to said layer of graphene material.

14. The bi-polar electrode of claim 1, wherein said layer of graphene material comprises graphene oxide sheets having an oxygen content from 1% to 5% by weight.

15. The bi-polar electrode of claim 1, wherein said layer of graphene material comprises a thin film of graphene oxide having an oxygen content less than 1%, an inter-graphene spacing less than 0.345 nm, and an electrical conductivity no less than 3,000 S/cm.

16. The bi-polar electrode of claim 1, wherein said layer of graphene material comprises a thin film of graphene oxide having an oxygen content less than 0.1%, an inter-graphene spacing less than 0.337 nm, and an electrical conductivity no less than 5,000 S/cm.

17. The bi-polar electrode of claim 1, wherein said layer of graphene material comprises a thin film of graphene oxide having an oxygen content no greater than 0.05%, an inter-graphene spacing less than 0.336 nm, a mosaic spread value no greater than 0.7, and an electrical conductivity no less than 8,000 S/cm.

18. The bi-polar electrode of claim 1, wherein said layer of graphene material comprises a thin film of graphene oxide having an inter-graphene spacing less than 0.336 nm, a mosaic spread value no greater than 0.4, and an electrical conductivity greater than 10,000 S/cm.

19. The bi-polar electrode of claim 1, wherein said layer of graphene material comprises a thin film of graphene oxide exhibiting an inter-graphene spacing less than 0.337 nm and a mosaic spread value less than 1.0.

20. The bi-polar electrode of claim 1, wherein said layer of graphene material comprises a thin film of graphene oxide having a degree of graphitization no less than 80% and/or a mosaic spread value no greater than 0.4.

21. The bi-polar electrode of claim 1, wherein the layer of graphene material comprises a thin film of graphene oxide that is obtained by depositing a graphene oxide gel onto said at least primary surface under the influence of an orientation-controlling stress and then heat-treating said graphene oxide gel at a heat treatment temperature from 80° C. to 3,250° C.

22. The bi-polar electrode of claim 1, wherein said layer of graphene material comprises a thin film of graphene oxide having chemically bonded graphene molecules or chemically merged graphene planes that are parallel to one another.

23. The bi-polar electrode of claim 1, wherein said layer of graphene material comprises a thin film of graphene oxide, when measured alone, having a physical density greater than 1.8 g/cm3, and/or a tensile strength greater than 40 MPa.

24. A rechargeable lithium battery or lithium-ion battery containing at least two bi-polar electrodes of claim 1 that are physically stacked together and electrically connected in series or in parallel.

25. The rechargeable lithium battery of claim 24, wherein said lithium battery is a lithium-ion battery, a lithium-sulfur battery, a lithium-selenium battery, a lithium sulfur/selenium battery, a lithium-air battery, a sodium-ion battery, a sodium metal battery, a zinc-ion battery, a zinc metal battery, a Zn—Ni battery, an aluminum-ion battery, an aluminum metal battery, a magnesium-ion battery, or a magnesium metal battery.

26. A capacitor containing at least two bi-polar electrodes as defined in claim 1 that are physically stacked together and electrically connected in series, which capacitor is a symmetric ultracapacitor, an asymmetric ultracapacitor, a hybrid supercapacitor-battery device, or a lithium-ion capacitor.

* * * * *